United States Patent
Lee et al.

(10) Patent No.: US 12,039,098 B2
(45) Date of Patent: Jul. 16, 2024

(54) ELECTRONIC DEVICE AND OPERATION METHOD OF ELECTRONIC DEVICE FOR CONTROLLING EXTERNAL ELECTRONIC DEVICE

(71) Applicant: Samsung Electronics Co., Ltd., Suwon-si (KR)

(72) Inventors: Hoseong Lee, Suwon-si (KR); Jeongmin Park, Suwon-si (KR); Seongmin Je, Suwon-si (KR); Changlim Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/896,618

(22) Filed: Aug. 26, 2022

(65) Prior Publication Data
US 2023/0018784 A1    Jan. 19, 2023

Related U.S. Application Data

(63) Continuation of application No. PCT/KR2022/010550, filed on Jul. 19, 2022.

(30) Foreign Application Priority Data

Jul. 19, 2021   (KR) .......................... 10-2021-0094105

(51) Int. Cl.
    *G06F 3/01* (2006.01)
    *G06F 3/0346* (2013.01)
    (Continued)

(52) U.S. Cl.
    CPC ............. *G06F 3/013* (2013.01); *G06F 3/012* (2013.01); *G06F 3/017* (2013.01); *H04R 1/1041* (2013.01);
    (Continued)

(58) Field of Classification Search
    CPC ...................................................... G06F 3/013
    See application file for complete search history.

(56) References Cited

U.S. PATENT DOCUMENTS 8,670,573 B2    3/2014   Theverapperuma et al.
10,042,420 B2   8/2018   McLean
(Continued)

FOREIGN PATENT DOCUMENTS

CN    111258429 A    6/2020
CN    112040361 A    12/2020
(Continued)

OTHER PUBLICATIONS

International Search Report and Written Opinion dated Oct. 21, 2022, issued in International Application No. PCT/KR2022/010550.

*Primary Examiner* — Gustavo Polo
(74) *Attorney, Agent, or Firm* — Jefferson IP Law, LLP

(57) ABSTRACT

An electronic device is provided. The electronic device includes a communication module, a first ultra-wideband (UWB) module, a second UWB module, and a processor operatively connected to the communication module, the first UWB module, and the second UWB module, wherein the processor is configured to determine a direction of a user's gaze, based on data acquired from the first UWB module and data acquired from the second UWB module, select at least one external electronic device positioned in the gaze direction, and send, through the communication module, a request to the selected external electronic device to output media.

24 Claims, 16 Drawing Sheets

(51) Int. Cl.
    *G06F 3/041*     (2006.01)
    *H04B 1/7163*     (2011.01)
    *H04R 1/10*     (2006.01)

(52) U.S. Cl.
    CPC ............ *G06F 3/0346* (2013.01); *G06F 3/041* (2013.01); *H04B 1/7163* (2013.01); *H04R 2420/07* (2013.01)

(56) References Cited

U.S. PATENT DOCUMENTS

| | | |
|---|---|---|
| 2011/0283334 A1 | 11/2011 | Choi et al. |
| 2016/0133052 A1 | 5/2016 | Choi et al. |
| 2020/0104703 A1* | 4/2020 | Yun ........................ G06N 3/045 |
| 2021/0158624 A1 | 5/2021 | Moon et al. |

FOREIGN PATENT DOCUMENTS

| | | |
|---|---|---|
| CN | 112925416 A | 6/2021 |
| KR | 10-2007-0018482 A | 2/2007 |
| KR | 10-1648021 B1 | 8/2016 |
| KR | 10-1728707 B1 | 4/2017 |
| KR | 10-1733057 B1 | 5/2017 |
| KR | 10-2236879 B1 | 4/2021 |
| KR | 10-2021-0063928 A | 6/2021 |
| KR | 10-2265086 B1 | 6/2021 |

* cited by examiner

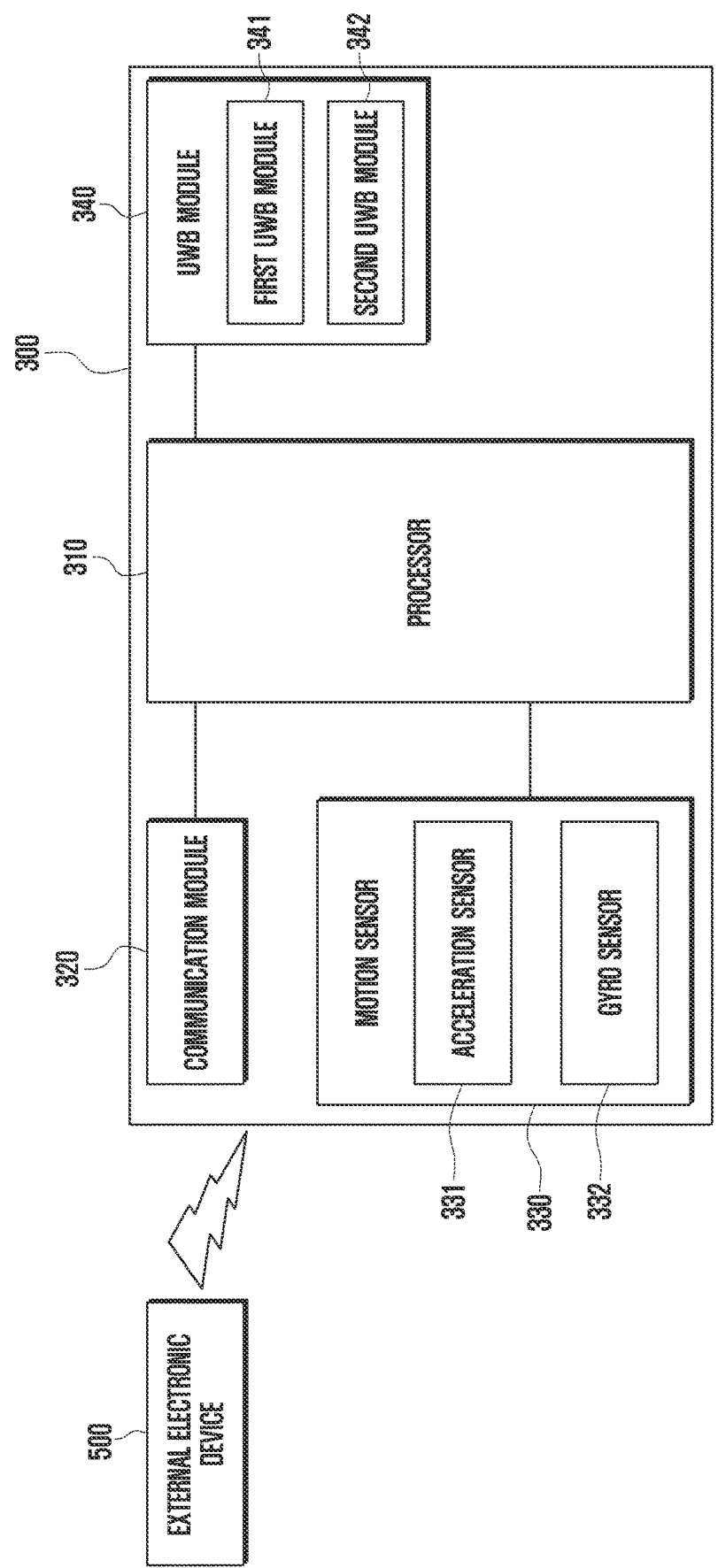

FIG. 7B
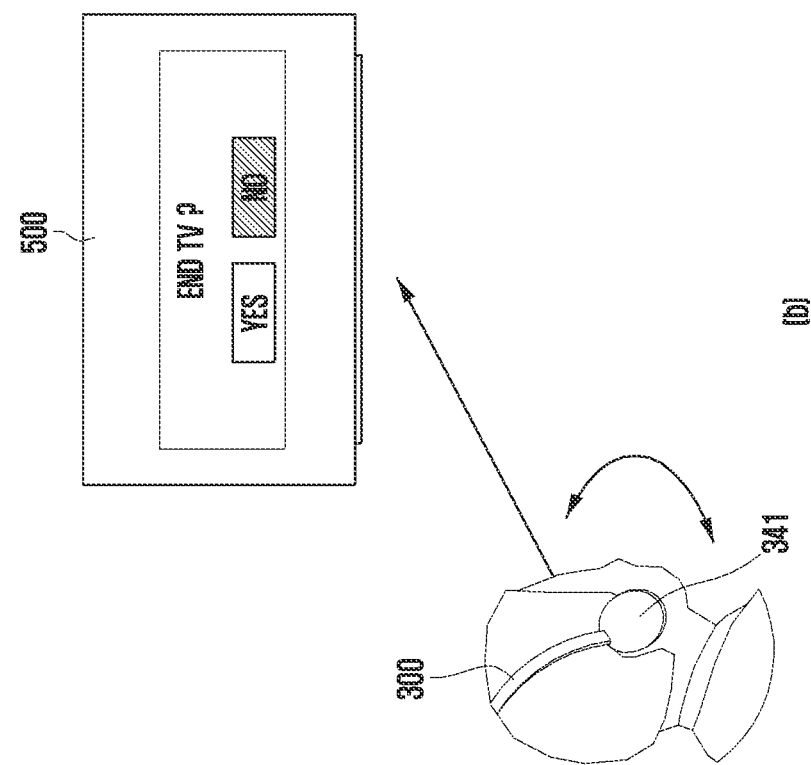
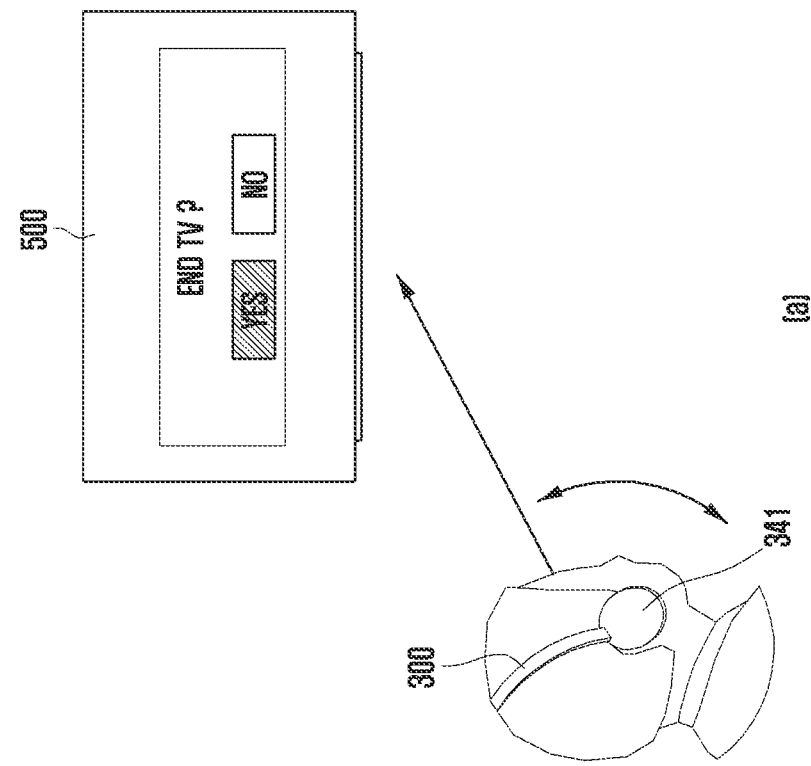

FIG. 7C
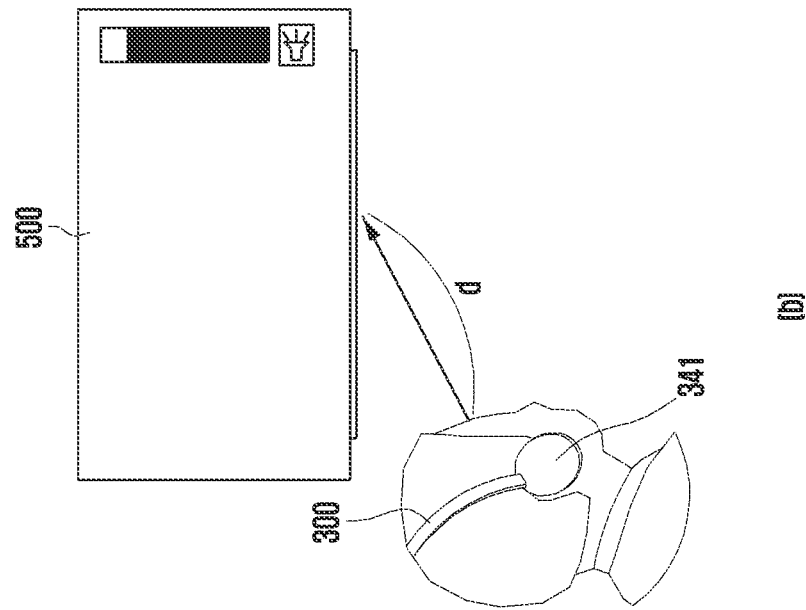
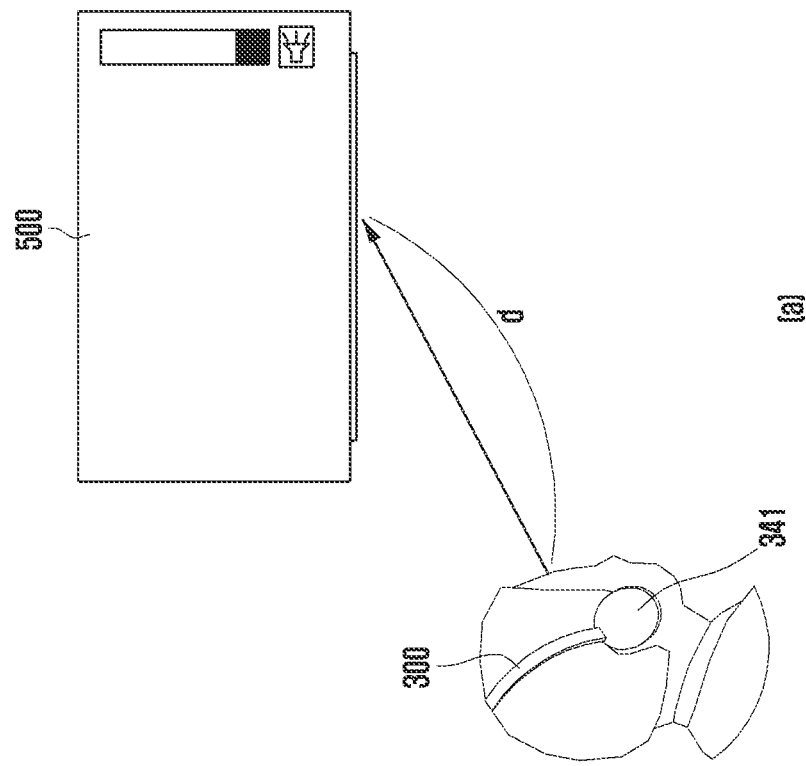

ELECTRONIC DEVICE AND OPERATION METHOD OF ELECTRONIC DEVICE FOR CONTROLLING EXTERNAL ELECTRONIC DEVICE

CROSS-REFERENCE TO RELATED APPLICATION(S)

This application is a continuation application, claiming priority under § 365(c), of an International application No. PCT/KR2022/010550, filed on Jul. 19, 2022, which is based on and claims the benefit of a Korean patent application number 10-2021-0094105, filed on Jul. 19, 2021, in the Korean Intellectual Property Office, the disclosure of which is incorporated by reference herein in its entirety.

TECHNICAL FIELD

The disclosure relates to an electronic device for controlling an external electronic device and a method for operating the electronic device. More particularly, the disclosure relates to an electronic device capable of determining a user's gaze direction by using an ultra-wideband (UWB) module, determining the user's motion by using a motion sensor, and controlling an external electronic device according to the user's gaze direction and motion, and a method for operating the electronic device.

BACKGROUND ART

Headsets accordingly to the related art typically include a microphone and a speaker and are solely configured to input or output sounds, based on wired connection with a sound generating device. Furthermore, control functions (e.g., sound source playback, recording, volume adjustment) of such headsets are commonly performed by a sound source generating device connected thereto.

Various types of wireless headsets have recently been developed, such as a Bluetooth earphone wirelessly connected to a sound source generating device, and a true wireless stereo (TWS) earphone, both types having wirelessly separated units. In addition to a wireless connection function, a wireless headset may have various sensors mounted thereon so as to perform a headset control function as well by the headset itself.

As a typical example, a sensor capable of sensing the user's motion, such as an acceleration sensor or a gyro sensor, may provide a control function based on whether the user wears a wireless headset, and a touch sensor may provide a control function based on the user's touch input. For example, a wireless headset may play a sound source upon sensing the user's motion of putting on the wireless headset, and may stop playing the sound source upon sensing the user's motion of taking the wireless headset off. As another example, the wireless headset may sense the user's touch and may play a sound source, stop the same, or play the next sound source on the list.

Ultra-wideband (UWB) refers to a short-range wireless communication technology for transmitting/receiving data in broad frequency bands by using short-time pulses. UWB modules have recently been used not only for short-range wireless communication, but in application fields. For example, UWB modules may be used in various application fields, such as distance measurement based on two way ranging (TWR) and time difference of arrival (TDOA), which are schemes of using radio wave arrival times, and angle measurement based on angle of arrival (AOA), which is a scheme of using radio-wave transmission/reception angles of antennas. Such UWB modules may be mounted on electronic devices (e.g., wireless headsets) and applied to perform various functions.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an electronic device capable of determining a user's motion and gaze direction by using a motion sensor and an ultra-wideband (UWB) module, and controlling an external electronic device.

Another aspect of the disclosure is to provide an electronic device to select an external electronic device positioned at the user's gaze recognized through a UWB module, and to control the selected external electronic device according to the user's motion recognized through a motion sensor.

For example, an electronic device disclosed herein may include multiple UWB modules, and respective UWB modules may be configured to be positioned on both ears when the user wears the electronic device. The electronic device may measure time of flight (ToF) with the external electronic device by using respective UWB modules on both sides, and may acquire relative distances from the external electronic device, respectively. For example, when the user's gaze is directed to the external electronic device, respective UWB modules are positioned symmetric with reference to the external electronic device, and the relative distances between respective UWB modules and the external electronic device may be identical. On the other hand, when the user's gaze is not directed to the external electronic device, the relative distances between respective UWB modules and the external electronic device may differ. Therefore, the electronic device may determine the user's gaze based on the difference in relative distance between respective UWB modules and the external electronic device. Based on the user's gaze, the electronic device may select an external electronic device positioned at the user's gaze. In addition, the electronic device may recognize the user's motions, such as gazing at a place, moving the head up and down, and moving the head left and right, through a motion sensor, and may control the selected external electronic device according to the user's motion. Therefore, the user may conveniently control the external electronic device by gazes and simple motions while wearing the electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communication module, a first UWB module, a second UWB module, and a processor operatively connected to the communication module, the first UWB module, and the second UWB module, wherein the processor is configured to determine a direction of a user's gaze, based on data acquired from the first UWB module and data acquired from the second UWB module, select at least one from among external electronic devices positioned in the gaze direction, and send, through the communication module, a request to the selected external electronic device to output media.

In accordance with another aspect of the disclosure, an electronic device connected to a mobile device configured to output media is provided. The electronic device includes a communication module, a first UWB module, a second UWB module, and a processor operatively connected to the communication module, the first UWB module, and the second UWB module, wherein the processor is configured to determine a direction of a user's gaze, based on data acquired from the first UWB module and data acquired from the second UWB module, select at least one from among external electronic devices positioned in the gaze direction, and send, through the communication module, a request to the selected external electronic device to output the media output from the mobile device.

In accordance with another aspect of the disclosure, a method for operating an electronic device is provided. The method includes determining a direction of a user's gaze, based on data acquired from a first UWB module and data acquired from a second UWB module, selecting at least one from among external electronic devices positioned in the gaze direction, and sending a request to the selected external electronic device to output media.

Advantageous Effects

For example, an electronic device may recognize a user's gaze by using a UWB module.

For example, an electronic device may recognize a user's gaze by using a difference in relative distance between units on both sizes and an external electronic device.

For example, an electronic device may operate a UWB module when a user gazes at a place, thereby preventing power consumption.

For example, an electronic device may select an external electronic device to be controlled by a user's gaze without a separate motion, thereby providing a convenient control environment to the user.

For example, an electronic device may control a convenient environment in which a user can control an external electronic device through simple motions.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 3 is a block diagram of a configuration of an electronic device and an external electronic device controlled by the electronic device according to an embodiment of the disclosure;

FIGS. 7A, 7B, and 7C illustrate an operation of controlling an external electronic device by an electronic device according to various embodiments of the disclosure.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
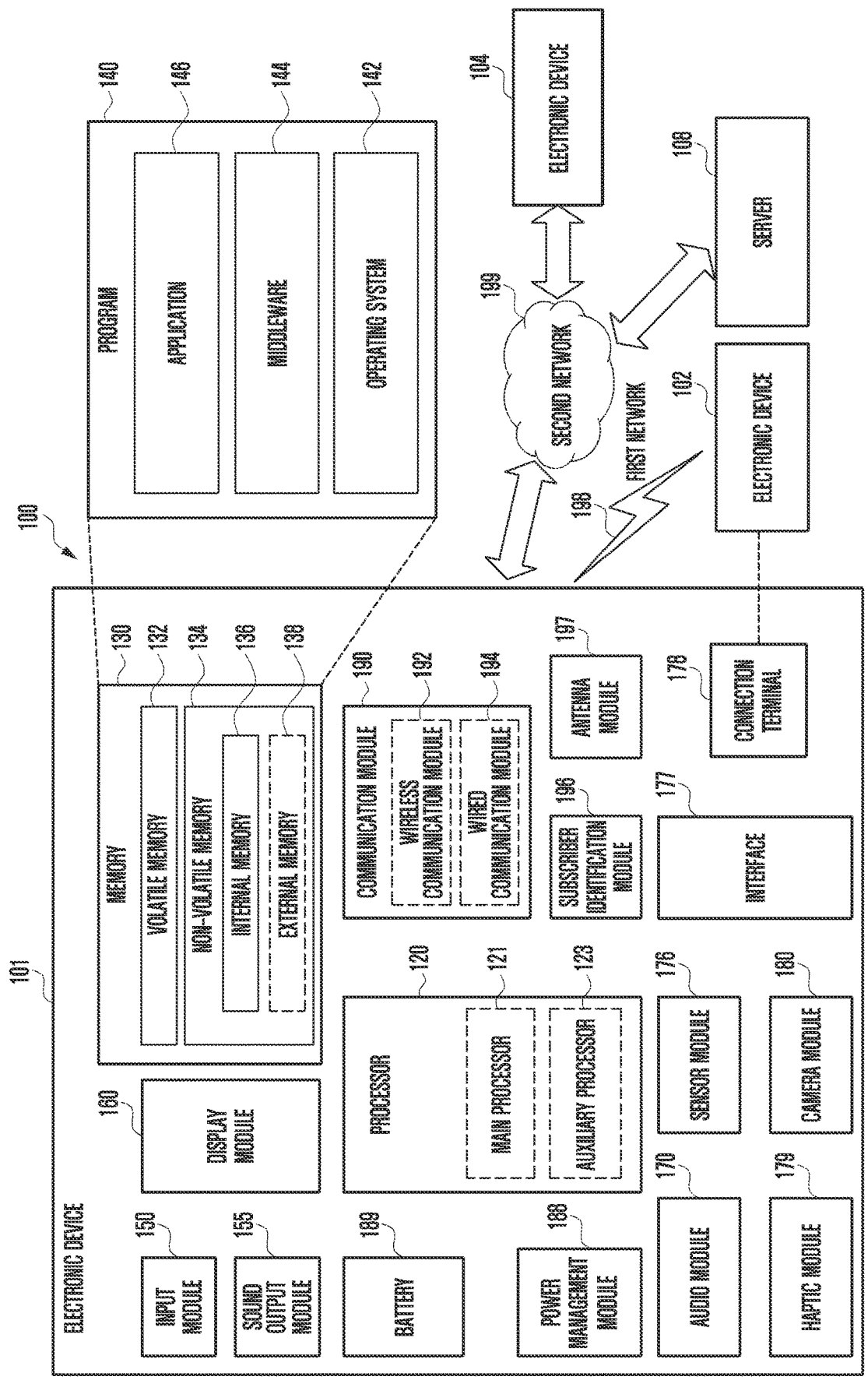
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
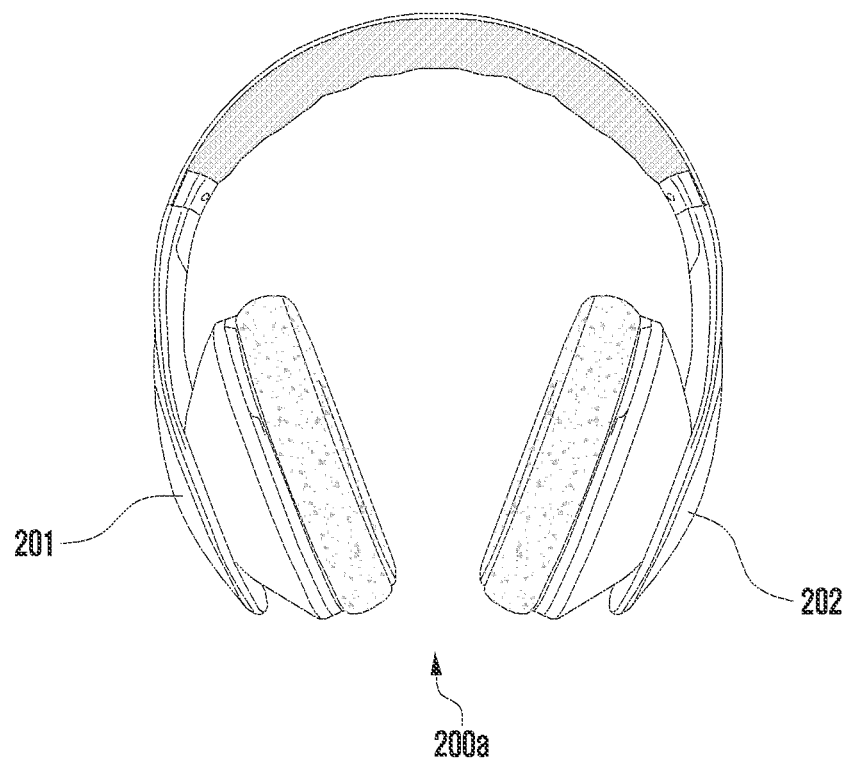
FIG. 2A illustrates a configuration of an electronic device according to an embodiment of the disclosure.

FIG. 2A illustrates a configuration of an electronic device 200a according to an embodiment of the disclosure.

Referring to FIG. 2A, the electronic device 200a (e.g., a headset) may include a microphone or a speaker. For example, the electronic device 200a may output a sound through the speaker.

The electronic device 200a may be worn on at least a part of a user's body (e.g., near the left ear of the user or the right ear of the user). For example, the electronic device 200a may be worn on the user's body and may output a sound near the user's ears through the speaker.

The electronic device 200a may convert a digital signal (e.g., digital data) to an analog signal (e.g., a sound), and may output the analog signal.

The electronic device 200a may receive a sound from outside the electronic device through the microphone, and may generate and store data on the received sound. For example, the electronic device 200a may generate or convert the received sound to electrical data. For example, the electronic device 200a may convert an analog signal to a digital signal. For example, the electronic device 200a may at least temporarily store data on the sound.

According to various embodiments of the disclosure, according to the purpose of use by the user, the electronic device 200a may have various forms and may provide various functions. The electronic device 200a may include, for example, a headset, a headphone, an earpiece, hearing aids, or personal sound amplification products.

The electronic device 200a may include a first unit 201 and a second unit 202. For example, the first unit 201 may be worn near the right ear of a user, and the second unit 202 may be worn near the left ear of the user.

The electronic device 200a may include at least one sensor (e.g., a wearing sensing sensor, a motion sensor, or a touch sensor, not shown) and a communication module (not shown). The at least one sensor may sense whether the electronic device 200a is worn on the user's body and a posture in which the electronic device 200a is worn on the user's body. For example, the at least one sensor may include at least one of a proximity sensor and a grip sensor. The at least one sensor may sense the amount of posture change caused by the motion of the user. For example, the at least one sensor may include an acceleration sensor and a gyro sensor. The acceleration sensor may sense acceleration on three axes, and the gyro sensor may sense an angular speed based on three axes. The at least one sensor may sense a gesture such as touching or swiping by the user's finger. The electronic device 200a may perform, in response to touch data sensed by the at least one sensor, control including at least one or a combination of at least two among music playback, pause, next music playback, and previous music playback. The communication module may be a module configured to wirelessly communicate with the outside. For example, the communication module may establish communication with another device and/or an access point (AP) through at least one or a combination of at least two among an ultra-wide band (UWB) module, a Bluetooth (BT) network, a Bluetooth low energy (BLE) network, a Wi-Fi network, an ANT+ network, a long-term evolution (LTE) network, a 5th generation (5G) network, and a narrowband Internet of things (NB-IoT) network. The UWB module (e.g., a first UWB module 341 and/or a second UWB module 342 in FIG. 3) may be placed in each of the first unit 201 and the second unit 202 of the electronic device 200a.

Figure 2B:
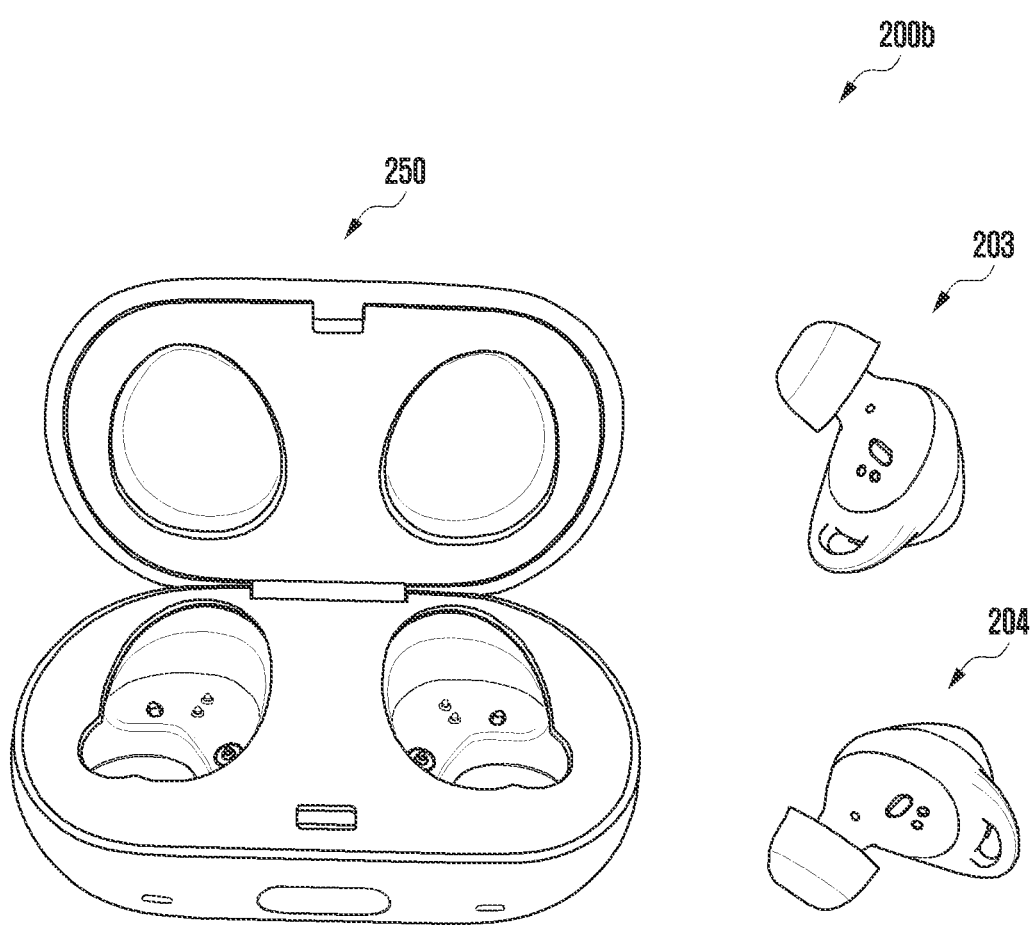
FIG. 2B illustrates a configuration of an electronic device according to an embodiment of the disclosure.

FIG. 2B illustrates a configuration of an electronic device 200b according to an embodiment of the disclosure.

Referring to FIG. 2B, the electronic device 200b may be a device wirelessly connected to an external electronic device (e.g., a smartphone) so as to receive an audio signal output from the external electronic device and output the audio signal through a speaker or to transmit an audio signal input from the outside (e.g., a user) through a microphone to the external electronic device. The electronic device 200b may include at least one among a first device 203, a second device 204, and a case 250.

The first device 203 and the second device 204 may be received (mounted) in the case 250, or may be separated (detached) from the case 250. Each of the first device 203 and the second device 204 may be worn on a part of the user's body (e.g., the left ear of the user or the right ear of the user). Each of the first device 203 and the second device 204 may include a speaker or a microphone. Each of the first device 203 and the second device 204 may output an audio signal through the speaker, or may receive (input) an audio signal from the outside through the microphone. When the first device 203 and the second device 204 are separated from the case 250, power sources may be turned on. When the first device 203 and the second device 204 are mounted in the case 250, the power sources of the first device 203 and the second device 204 may be turned off or charged.

According to an embodiment of the disclosure, the first device 203 may function as a master, and the second device 204 may function as a slave. According to another embodiment, the first device 203 may function as a slave, and the second device 204 may function as a master. Each of the first device 203 and the second device 204 may periodically transmit sensed information to an external electronic device.

The case 250 may include a housing having a receiving part (or a space part) configured to receive (or store) the first device 203 or the second device 204, and a cover attached to the housing. The receiving part may be configured to magnetically attract the first device 203 or the second device 204 into the case 250. When the first device 203 and the second device 204 are mounted in the receiving part, or when the cover is closed, the case 250 may control the power sources of the first device 203 and the second device 204 to be turned off or charged. When the first device 203 and the second device 204 are separated from the receiving part, or when the cover is opened, the case 250 may turn on the power sources of the first device 203 and the second device 204.

The electronic device 200*b* may include at least one sensor (e.g., a wearing sensing sensor, a motion sensor, or a touch sensor, not shown) and a communication module (not shown). The at least one sensor may sense whether the electronic device 200*b* is worn on the user's body and a posture in which the electronic device 200*b* is worn on the user's body. For example, the at least one sensor may include at least one of a proximity sensor and a grip sensor. The at least one sensor may sense the amount of posture change caused by the motion of the user. For example, the at least one sensor may include an acceleration sensor and a gyro sensor. The acceleration sensor may sense acceleration on three axes, and the gyro sensor may sense an angular speed based on three axes. The at least one sensor may sense a gesture such as touching or swiping by the user's finger. The electronic device 200*b* may perform, in response to touch data sensed by the at least one sensor, control including at least one or a combination of at least two among music playback, pause, next music playback, and previous music playback. The communication module may be a module configured to wirelessly communicate with the outside. For example, the communication module may establish communication with another device and/or an access point (AP) through at least one or a combination of at least two among an ultra-wide band (UWB) module, a Bluetooth (BT) network, a Bluetooth low energy (BLE) network, a Wi-Fi network, an ANT+ network, a long-term evolution (LTE) network, a 5th generation (5G) network, and a narrowband Internet of things (NB-IoT) network.

The UWB module (e.g., a first UWB module 341 and/or a second UWB module 342 in FIG. 3) may be placed in each of the first device 203 and the second device 204 of the electronic device 200*b*.

Figure 2C:
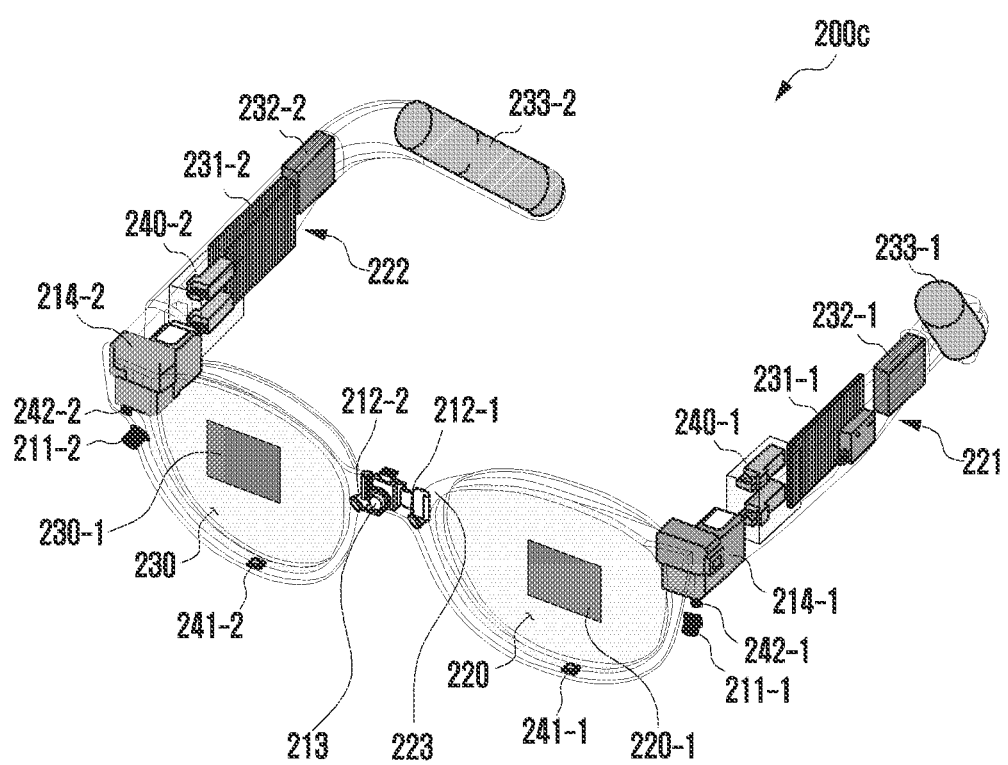
FIG. 2C illustrates a configuration of an electronic device according to an embodiment of the disclosure.

FIG. 2C illustrates a configuration of an electronic device (e.g., the electronic device 101 in FIG. 1) according to an embodiment of the disclosure.

Referring to FIG. 2C, the electronic device 200*c* may be an electronic device 200*c* which has been manufactured to be wearable on a user's head. For example, the electronic device 200*c* may be formed in the shape of at least one of glasses, goggles, a helmet, or a hat, but is not limited thereto. The electronic device 200*c* may include multiple transparent members (e.g., a first transparent member 220 and/or a second transparent member 230) corresponding to both eyes (e.g., the left eye and/or the right eye) of the user, respectively.

The electronic device 200*c* may provide the user with an image related to an augmented reality (AR) service. The electronic device 200*c* may project or display virtual objects onto the first transparent member 220 and/or the second transparent member 230 so that at least one virtual object is overlaid on the view seen by the user through the first transparent member 220 and/or the second transparent member 230 of the electronic device 200*c*.

Referring to FIG. 2C, the electronic device 200*c* according to an embodiment may include a body part 223, support parts (e.g., a first support part 221 and a second support part 222), and hinge parts (e.g., a first hinge part 240-1 and a second hinge part 240-2).

The body part 223 may be operatively connected to the support parts 221 and 222 through the hinge parts 240-1 and 240-2. The body part 223 may include a portion formed to be at least partially placed on the user's nose.

Each of the support parts 221 and 222 may include a support member having a shape capable of being put on the user's ear. The support parts 221 and 222 may include the first support part 221 to be placed on the left ear and/or the second support part 222 to be placed on the right ear.

According to an embodiment of the disclosure, the first hinge part 240-1 may connect the first support part 221 to the body part 223 such that the first support part 221 can rotate with respect to the body part 223. The second hinge part 240-2 may connect the second support part 222 to the body part 223 such that the second support part 222 can rotate with respect to the body part 223. According to another embodiment, the hinge parts 240-1 and 240-2 of the electronic device 200*c* may be omitted. For example, the body part 223 may be directly connected to the support parts 221 and 222.

The body part 223 may include at least one transparent member (e.g., the first transparent member 220 or the second transparent member 230), at least one display module (e.g., a first display module 214-1 or a second display module 214-2), at least one camera module (e.g., a front view imaging camera module 213), eye tracking camera modules (e.g., a first eye tracking camera module 212-1 and a second eye tracking camera module 212-2), recognition camera modules (e.g., a first recognition camera module 211-1 and a second recognition camera module 211-2), and at least one microphone (e.g., a first microphone 241-1 or a second microphone 241-2).

In the electronic device 200*c* illustrated in FIG. 2C, light generated in display modules 214-1 and 214-2 may be projected on the transparent members 220 and 230 to display information. For example, light generated in the first display module 214-1 may be projected on the first transparent member 220, and light generated in the second display module 214-2 may be projected on the second transparent member 230. When light capable of displaying virtual objects is projected on the transparent members 220 and 230 which are at least partially formed of a transparent material, the user may recognize the view over which the virtual objects are overlaid. It may be understood that the display module 160 illustrated in FIG. 1 includes the display modules 214-1 and 214-2 and the transparent members 220 and 230 of the electronic device 200*c* illustrated in FIG. 2C. However, the electronic device 200*c* described in the disclosure is not limited to displaying information through the above-described method. A display module, which may be included in the electronic device 200*c*, may be replaced with a display module including various types of information displaying methods. For example, when a display panel including a light-emitting element formed of a transparent material is embedded in each of the transparent members 220 and 230, it is possible to display information without any separate display module (e.g., the first display module 214-1 and the second display module 214-2). In this case, the display module 160 illustrated in FIG. 1 may imply the transparent members 220 and 230 and the display panel included in each of the transparent members 220 and 230.

Virtual objects output through the display modules 214-1 and 214-2 may include information related to an application program executed in the electronic device 200*c* and/or information related to an external object that is positioned in a real space recognized by the user through the transparent members 220 and 230. The external object may include things existing in the real space. Hereinafter, the real space recognized by the user through the transparent members 220 and 230 will be called a field-of-view (FoV) region of the user. For example, the electronic device 200*c* may identify an external object included in at least a part of a region, which is determined to be the user's FoV, in image information related to a real space, acquired through a camera module (e.g., the imaging camera module 213) of the electronic device 200c. The electronic device 200c may output a virtual object related to the identified external object through the display modules 214-1 and 214-2.

The electronic device 200c may display a virtual object related to an augmented reality service together therewith based on image information related to the real space, acquired through the imaging camera module 213 of the electronic device 200c. The electronic device 200c may display the virtual object, based on display modules arranged to correspond to both eyes of the user (e.g., the first display module 214-1 corresponding to the left eye and/or the second display module 214-2 corresponding to the right eye). According to an embodiment, the electronic device 200c may display the virtual object, based on preset configuration information (e.g., resolution, a frame rate, brightness, and/or a display region).

The transparent members 220 and 230 may include condenser lenses (not shown) and/or waveguides (e.g., a first waveguide 220-1 and/or a second waveguide 230-1). For example, the first waveguide 220-1 may be partially positioned in the first transparent member 220, and the second waveguide 230-1 may be partially positioned in the second transparent member 230. Light emitted from the display modules 214-1 and 214-2 may be incident on one-side surfaces of the transparent members 220 and 230. The light incident on the one-side surfaces of the transparent members 220 and 230 may be transferred to the user through the waveguides 220-1 and 230-1 positioned in the transparent members 220 and 230. Each of the waveguides 220-1 and 230-1 may be made of glass, plastic, or a polymer, and may include a nanopattern formed on one surface of the inside or the outside thereof. For example, the nanopattern may include a polygonal or curved grating structure. Light incident on one-side surfaces of the transparent members 220 and 230 may be propagated or reflected inside the waveguides 220-1 and 230-1 by the nanopatterns and transferred to the user. The waveguides 220-1 and 230-1 may include at least one among at least one diffractive element (e.g., a diffractive optical element (DOE) or a holographic optical element (HOE)) or a reflective element (e.g., a reflective mirror). The waveguides 220-1 and 230-1 may use the at least one diffractive element or the reflective element to guide, to the user's eyes, light emitted from the display modules 214-1 and 214-2.

The electronic device 200c may include the imaging camera module 213 (e.g., a red green blue (RGB) camera module) configured to capture an image corresponding to a field of view (FoV) of the user and/or measure the distance to an object, the eye tracking camera modules 212-1 and 212-2 configured to determine the direction of the user's gaze, and/or recognition camera modules (gesture camera modules) 211-1 and 211-2 configured to recognize a predetermined space. For example, the imaging camera module 213 may capture an image in the forward direction of the electronic device 200c, and the eye tracking camera modules 212-1 and 212-2 may capture an image in a direction opposite to the image-capturing direction of the imaging camera module 213. For example, the first eye tracking camera module 212-1 may partially capture an image of the left eye of the user, and the second eye tracking camera module 212-2 may partially capture an image of the right eye of the user. The imaging camera module 213 may include a camera module having a high resolution, such as a high-resolution (HR) camera module and/or a photo/video (PV) camera module. The eye tracking camera modules 212-1 and 212-2 may detect the user's pupils to track a gaze direction. The tracked gaze direction may be used when the center of a virtual image including a virtual object is moved in response to the gaze direction. The recognition camera modules 211-1 and 211-2 may sense a user gesture within a preconfigured distance (e.g., a predetermined space) and/or the predetermined space. The recognition camera modules 211-1 and 211-2 may include a camera module including a global shutter (GS). For example, the recognition camera modules 211-1 and 211-2 may be a camera module including a GS capable of reducing a rolling shutter (RS) phenomenon, in order to detect and track a fast hand gesture and/or minute movement of a finger or the like.

The electronic device 200c may use at least one camera module 211-1, 211-2, 212-1, 212-2, or 213 to detect eyes corresponding to a dominant eye and/or a nondominant eye, among the left eye and/or the right eye. For example, the electronic device 200c may sense eyes corresponding to a dominant eye and/or a nondominant eye, based on the direction of the user's gaze to an external object or a virtual object.

The number and position of the at least one camera module (e.g., the imaging camera module 213, the eye tracking camera modules 212-1 and 212-2 and/or the recognition camera modules 211-1 and 211-2) included in the electronic device 200c illustrated in FIG. 2C may not be limited. For example, the number and position of at least one camera module (e.g., the imaging camera module 213, the eye tracking camera modules 212-1 and 212-2 and/or the recognition camera modules 211-1 and 211-2) may be variously changed based on the form (e.g., shape or size) of the electronic device 200c.

The electronic device 200c may include at least one light-emitting device (illumination LED) (e.g., a first light-emitting device 242-1 and a second light-emitting device 242-2) configured to increase the accuracy of at least one camera module (e.g., the imaging camera module 213, the eye tracking camera modules 212-1 and 212-2, and/or the recognition camera modules 211-1 and 211-2). For example, the first light-emitting device 242-1 may be placed in a position corresponding to the left eye of the user, and the second light-emitting device 242-2 may be placed in a position corresponding to the right eye of the user. In an embodiment, the light-emitting devices 242-1 and 242-2 may be used as auxiliary means for increasing the accuracy when the user's pupils are imaged by the eye tracking camera modules 212-1 and 212-2, and may include IR LEDs for generating light having an infrared wavelength. Further, the light-emitting devices 242-1 and 242-2 may be used as auxiliary means when a subject to be imaged is not easy to detect due to a dark environment or mixed and reflected light from multiple light sources at the time of imaging the user's gesture by using the recognition camera modules 211-1 and 211-2.

The electronic device 200c may include microphones (e.g., the first microphone 241-1 and the second microphone 241-2) configured to receive the user's voice and a surrounding sound. For example, the microphones 241-1 and 241-2 may be elements included in the audio module 170 in FIG. 1.

The first support part 221 and/or the second support part 222 may include printed circuit boards (PCB) (e.g., a first printed circuit board 231-1 and a second printed circuit board 231-2), speakers (e.g., a first speaker 232-1 and a second speaker 232-2), and/or batteries (e.g., a first battery 233-1 and a second battery 233-2), respectively.

The speakers 232-1 and 232-2 may include the first speaker 232-1 configured to transfer an audio signal to the left ear of the user and the second speaker 232-2 configured to transfer an audio signal to the right ear of the user. The speakers 232-1 and 232-2 may be elements included in the audio module 170 in FIG. 1.

The electronic device 200c may include multiple batteries 233-1 and 233-2, and may supply power to the printed circuit boards 231-1 and 231-2 through a power management module (e.g., the power management module 188 in FIG. 1). For example, the multiple batteries 233-1 and 233-2 may be electrically connected to the power management module (e.g., the power management module 188 in FIG. 1).

Hereinbefore, the electronic device 200c has been described as a device configured to display augmented reality. However, the electronic device 200c may be a device configured to display virtual reality (VR). In this case, the transparent members 220 and 230 may be formed of an opaque material such that the user cannot see through the transparent members 220 and 230. Further, each of the transparent members 220 and 230 may function as the display module 160. For example, each of the transparent members 220 and 230 may include a display panel for displaying information.

According to various embodiments, the electronic device 200c may include at least one sensor (e.g., a wearing sensing sensor, a motion sensor, or a touch sensor, not shown) and a communication module (not shown). The at least one sensor may sense whether the electronic device 200c is worn on the user's body and a posture in which the electronic device 200c is worn on the user's body. For example, the at least one sensor may include at least one of a proximity sensor and a grip sensor. The at least one sensor may sense the amount of posture change caused by the motion of the user. For example, the at least one sensor may include an acceleration sensor and a gyro sensor. The acceleration sensor may sense acceleration on three axes, and the gyro sensor may sense an angular speed based on three axes. The at least one sensor may sense a gesture such as touching or swiping by the user's finger. The electronic device 200c may perform, in response to touch data sensed by the at least one sensor, control including at least one or a combination of at least two among music playback, pause, next music playback, and previous music playback. The communication module may be a module configured to wirelessly communicate with the outside. For example, the communication module may establish communication with another device and/or an access point (AP) through at least one or a combination of at least two among an ultra-wide band (UWB) module, a Bluetooth (BT) network, a Bluetooth low energy (BLE) network, a Wi-Fi network, an ANT+ network, a long-term evolution (LTE) network, a 5th generation (5G) network, and a narrowband Internet of things (NB-IoT) network.

The UWB module (e.g., a first UWB module 341 and/or a second UWB module 342 in FIG. 3) may be positioned at the front portion of the electronic device 200c.

A UWB module 340 may include at least one UWB antenna. For example, the UWB antennas may be arranged in the form of a right triangle, and may be arranged such that the distances between the UWB antennas are similar to each other. For example, when the UWB antennas are arranged in the form of a right triangle, the front view imaging camera module 213 may be disposed between the UWB antennas. The UWB module (e.g., the first UWB module 341 and/or the second UWB module 342 in FIG. 3) may be disposed around the first recognition camera module 211-1 and the second recognition camera module 211-2 positioned at the front surface portion of the electronic device 200c.

The electronic device 200c may acquire, through the UWB module 340, information (e.g., a distance or a direction) about the position thereof relative to an external electronic device (e.g., an external electronic device 500 in FIG. 3). For example, when the relative distance between the electronic device 200c and the external electronic device 500 has a value smaller than a predetermined value, the electronic device 200c may activate at least some functions of the electronic device 200c.

The electronic device 200c may track the direction of the user's gaze through the eye tracking camera modules 212-1 and 212-2, and may select, based on the tracked gaze direction, the external electronic device 500 to be controlled. The electronic device 200c may determine the direction of the user's gaze through the UWB module (e.g., the first UWB module 341 and/or the second UWB module 342 in FIG. 3), and may select, based on the determined gaze direction, the external electronic device 500 to be controlled. The electronic device 200c may determine the direction of the user's gaze by using at least one of the UWB module and the eye tracking camera modules 212-1 and 212-2.

The electronic device 200c may determine the type of the external electronic device 500, based on an image of the external electronic device 500 acquired through the front view imaging camera module 213, and may generate a control command corresponding to the type of the external electronic device 500.

The electronic device 200c may determine a motion of the user through the recognition camera modules 211-1 and 211-2, and may generate a control command based on the determined motion of the user.

FIG. 3 is a block diagram of a configuration of an electronic device and an external electronic device controlled by the electronic device according to an embodiment of the disclosure.

Referring to FIG. 3, the electronic device 300 may include a processor 310, a communication module 320, a motion sensor 330, and a UWB module 340. The elements included in FIG. 3 correspond to some of elements included in the electronic device 300, and the electronic device 300 may include various elements illustrated in FIG. 1 in addition thereto.

The communication module 320 may communicate with the external electronic device 500, a server, and/or an external mobile device (e.g., a smartphone) through a first network (e.g., the first network 198 in FIG. 1) (e.g., a short-range communication network such as Bluetooth, Wi-Fi direct, or infrared data association (IrDA)) or a second network (e.g., the second network 199 in FIG. 1) (e.g., a long-range communication network such as a legacy cellular network, a 5G network, a next-generation communication network, Internet, or a computer network (e.g., LAN or WAN)). For example, the communication module 320 may transmit the control command generated by the processor 310 to the external electronic device 500, the server, and/or the external mobile device (e.g., the smartphone).

The motion sensor 330 may measure a motion signal related to the movement of the user. The motion sensor 330 may be mounted in the head region of the user to measure a motion signal related to the movement of the user's head.

The motion sensor 330 may include an acceleration sensor 331 and/or a gyro sensor 332. For example, the acceleration sensor 331 may measure a signal related to the acceleration of the electronic device 300. For example, the acceleration sensor 331 may measure the rotation angle of a roll axis, a pitch axis, or a yaw axis with reference to a reference axis. For example, the gyro sensor 332 may measure a signal related to the angular speed of the electronic device 300. For example, the gyro sensor 332 may measure the amount of change in the rotation angle of the roll axis, the pitch axis, or the yaw axis per unit of time with reference to a reference axis.

The UWB module 340 may include the first UWB module 341 and the second UWB module 342. The first UWB module 341 and/or the second UWB module 342 may perform communication by using an ultra-wideband (UWB) wireless communication method. This specification assumes that the electronic device 300 supports a UWB communication method, but the first UWB module 341 and/or the second UWB module 342 may be replaced with a communication module for supporting various communication methods which can measure the distance between the communication module and the external electronic device 500. According to an embodiment, the first UWB module 341 and/or the second UWB module 342 may include at least one UWB antenna.

The processor 310 may measure the distance to the external electronic device 500 through the first UWB module 341 and/or the second UWB module 342. For example, the processor 310 may measure the distance therebetween, based on the time of flight (ToF)) between the first UWB module 341 and/or the second UWB module 342 and the external electronic device 500. The distance d therebetween may be determined by Equation 1.

$$d = C * \text{ToF} \quad \text{Equation 1}$$

Here, C may be the speed of light ($2.997 * 10^8$ m/s).

The processor 310 may measure the distance between the first UWB module 341 and/or the second UWB module 342 and the external electronic device 500 by using a time difference of arrival (TDoA) scheme. Specifically, the processor 310 may designate the first UWB module 341 and/or the second UWB module 342 as a UWB tag and designate the external electronic device 500 as a UWB anchor, and may measure the distance therebetween, based on the difference between the time when the first UWB module 341 and/or the second UWB module 342 transmits a data packet and the time when the external electronic device 500 receives the data packet.

In one example, the processor 310 may determine ToF as in Equation 2, based on the time difference between a timestamp when the first UWB module 341 and/or the second UWB module 342 transmit a data packet and a timestamp when the external electronic device 500 receives the data packet.

ToF=UWB tag data transmission time (timestamp)– UWB anchor data reception time (timestamp)     Equation 2

The processor 310 may measure the distance between the first UWB module 341 and/or the second UWB module 342 and the external electronic device 500 by using a two-way ranging (TWR) scheme. According to an embodiment, the processor 310 may perform a distance and direction information measurement operation using the two-way ranging (TWR) scheme between external electronic devices between which clocks are not synchronized and UWB communication can be performed. The TWR operation may be divided into single-sided two-way ranging (SS-TWR) and double-sided two-way ranging (DS-TWR).

The processor 310 may perform the distance and direction information measurement operation through a single-sided two-way ranging (SS-TWR) scheme and a double-sided two-way ranging (DS-TWR) scheme. The processor 310 may designate the first UWB module 341 and/or the second UWB module 342 as a UWB tag and designate the external electronic device 500 as a UWB anchor, and may measure the distance therebetween based on the time taken for the first UWB module 341 and/or the second UWB module 342 to transmit a data packet and receive a response from the external electronic device 500.

In another example, the processor 310 may determine ToF as in Equation 3, based on the time ($T_{poll}$) taken for the first UWB module 341 and/or the second UWB module 342 to transmit a data packet and receive a response and the time ($T_{reply}$) taken for the external electronic device 500 to receive the data packet and transmit the response.

$$\text{ToF} = \frac{Tpoll - Treply}{2} \quad \text{Equation 3}$$

The processor 310 may measure the relative angle between the first UWB module 341 and/or the second UWB module 342 and the external electronic device 500, based on communication signals from the first UWB module 341 and/or the second UWB module 342 and the external electronic device 500. According to an embodiment, the first UWB module 341 and/or the second UWB module 342 may include at least two UWB antennas.

The processor 310 may measure a relative angle (e.g., an angle of arrival (AOA)) between the first UWB module 341 and/or the second UWB module 342 and the external electronic device 500. The processor 310 may acquire a signal, transmitted from the external electronic device 500, through a first antenna and a second antenna of the first UWB module 341 and/or the second UWB module 342. For example, the processor 310 may acquire a signal arrival time and a signal phase of each of the first antenna and the second antenna of the first UWB module 341 and/or the second UWB module 342. The processor 310 may determine the relative angle between the first UWB module 341 and/or the second UWB module 342 and the external electronic device 500, based on differences in the signal arrival time and the signal phase, acquired by each of the first antenna and the second antenna of the first UWB module 341 and/or the second UWB module 342. The processor 310 may determine the relative angle θ by Equation 4.

$$\theta = \arcsin\frac{\alpha\lambda}{2\pi d} \quad \text{Equation 4}$$

Here, d is the distance between the first antenna and the second antenna, λ is a wavelength, α is the difference between a signal phase acquired by the first antenna and a signal phase acquired by the second antenna.

The first UWB module 341 may be positioned in a first unit (e.g., a right unit) of the electronic device 300, and the second UWB module 342 may be positioned in a second unit (e.g., a left unit) of the electronic device 300. For example, in FIG. 2A, the first UWB module 341 may be positioned in the first unit 201 of the electronic device 200a, and the second UWB module 342 may be positioned in the second unit 202 of the electronic device 200a. For example, in FIG. 2B, the first UWB module 341 may be positioned in the first device 203 of the electronic device 200b, and the second UWB module 342 may be positioned in the second device 204 of the electronic device 200b. For example, in FIG. 2C, the first UWB module 341 may be positioned near the first recognition camera module 211-1 and the second recognition camera module 211-2 positioned at the front surface portion of the electronic device 200c.

The external electronic device 500 may include an electronic device capable of directly/indirectly communicating with the electronic device 300.

According to an embodiment, the external electronic device 500 may include a communication module, and may directly and/or indirectly receive a control command from the electronic device 300 through the communication module. For example, the external electronic device 500 may directly receive a control command from the electronic device 300 through the communication module. For example, the external electronic device 500 may indirectly receive a control command generated by the electronic device 300 from a server and/or an external mobile device (e.g., a smartphone) through the communication module.

According to an embodiment, the external electronic device 500 may include a UWB module, and the electronic device 300 may measure a relative distance and/or a relative angle between the electronic device 300 and the external electronic device 500 through the UWB module of the external electronic device 500. The external electronic device 500 may be connected to a UWB accessory (e.g., a UWB accessory 510 in FIGS. 8A and 8B), and the electronic device 300 may measure a relative distance and/or a relative angle between the electronic device 300 and the external electronic device 500 through the UWB accessory 510.

Figure 4:
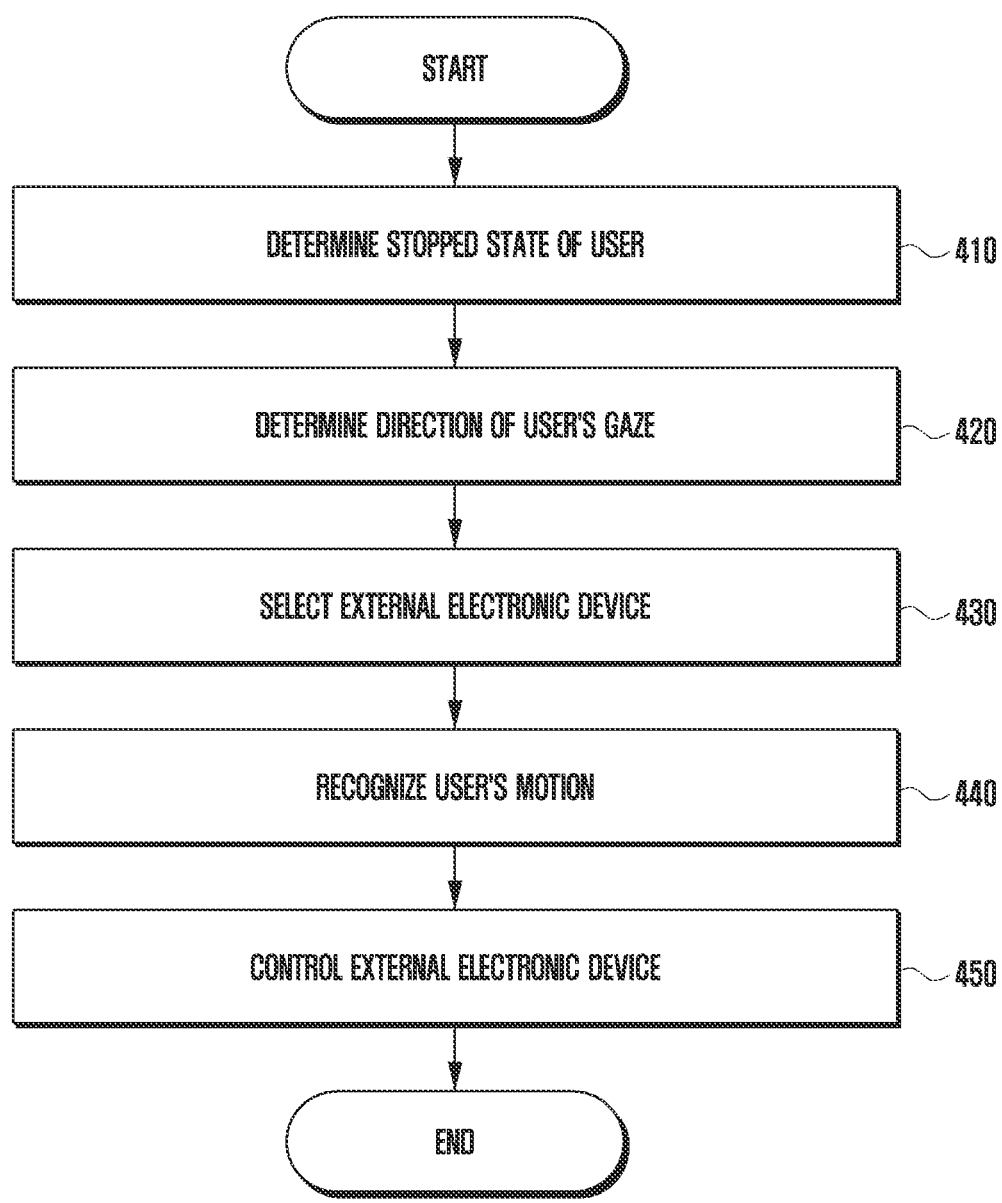
FIG. 4 is a flowchart illustrating a method for controlling an external electronic device by an electronic device according to an embodiment of the disclosure.

FIG. 4 is a flowchart illustrating a method for controlling an external electronic device by an electronic device according to an embodiment of the disclosure.

Referring to FIG. 4, in operation 410, the processor 310 may determine that a user's motion is in a stopped state.

The processor 310 may acquire a signal related to a user's motion from the motion sensor 330. For example, the motion sensor 330 may include the acceleration sensor 331 and/or the gyro sensor 332, and may measure a signal related to the user's motion.

The processor 310 may acquire user motion information, based on the signal acquired from the motion sensor 330. For example, the processor 310 may acquire, based on the signal measured by the motion sensor 330, information about the user's motion, such as a stopped state, a motion of nodding the head up and down, or a motion of shaking the head left and right.

When data related to the signal acquired from the motion sensor 330 has a value smaller than a predetermined value, the electronic device 300 may determine that the user's motion is in the stopped state. In another example, when acceleration data acquired from the acceleration sensor 331 has a value smaller than the predetermined value, and when angular speed data acquired from the gyro sensor 332 has a value smaller than the predetermined value, the electronic device 300 may determine that the user's motion is in the stopped state.

The processor 310 may determine the direction of the user's gaze in response to determining that the user's motion is in the stopped state. For example, when it is determined that the user's motion is in the stopped state, the processor 310 may restrict operations of the first UWB module 341 and/or the second UWB module 342, which consume a large amount of current due to high-frequency communication when the first UWB module 341 and/or the second UWB module 342 are operated, and thus may reduce power consumption of the electronic device 300. For example, when it is determined that the user's motion is in the stopped state, the processor 310 may transmit an advertising message to the external electronic device 500 through a communication module (e.g., BLE communication), and may receive a response message (e.g., a BLE packet message) from the external electronic device. The processor 310 may activate the first UWB module 341 and/or the second UWB module 342, based on the response message received from the external electronic device 500.

According to an embodiment of the disclosure, the processor 310 may maintain the first UWB module 341 and/or the second UWB module 342 in the activated state regardless of a recognized motion of the user.

In operation 420, the processor 310 may determine the direction of the user's gaze.

The processor 310 may determine the gaze direction by using UWB communication of the first UWB module 341 and the second UWB module 342.

The processor 310 may measure the distance, based on a data transmission/reception time (the time of flight (ToF)) between the first UWB module 341 and the second UWB module 342. For example, the distance d therebetween may be determined by the Equation 1.

The processor 310 may use a time difference of arrival (TDoA) scheme to measure the distance between the first UWB module 341 and the second UWB module 342. The processor 310 may designate the first UWB module 341 as a UWB tag and designate the second UWB module 342 as a UWB anchor, and may measure the distance therebetween based on the difference between the time when the first UWB module 341 transmits a data packet and the time when the second UWB module 342 receives the data packet. For example, the processor 310 may determine ToF as in Equation 2, based on a time difference between a timestamp when the first UWB module 341 transmits a data packet and a timestamp when the second UWB module 342 receives the data packet.

The processor 310 may use a two-way ranging (TWR) scheme to measure the distance between the first UWB module 341 and the second UWB module 342. The processor 310 may designate the first UWB module 341 as a UWB tag and designate the second UWB module 342 as a UWB anchor, and may measure the distance therebetween based on the time taken for the first UWB module 341 to transmit a data packet and receive a response from the second UWB module 342. The processor 310 may determine ToF as in Equation 3, based on the time ($T_{poll}$) taken for the first UWB module 341 to transmit a data packet and receive a response and the time ($T_{reply}$) taken for the second UWB module 342 to receive the data packet and transmit the response.

According to an embodiment of the disclosure, in a process of manufacturing the electronic device 300, the distance between the first UWB module 341 and the second UWB module 342 may be stored in a memory (e.g., the memory 130 in FIG. 1) of the electronic device 300.

The processor 310 may determine the direction of the user's gaze, based on the distance between the first UWB module 341 and the second UWB module 342. For example, in an imaginary straight line connecting the first UWB module 341 to the second UWB module 342, the processor 310 may determine that a direction perpendicular to the imaginary straight line with reference to the center point of the straight line is the gaze direction.

The processor 310 may determine the gaze direction by using UWB communication between the first UWB module 341, the second UWB module 342, and the external electronic device 500.

The processor 310 may measure, based on the time of flight (ToF)) between the first UWB module 341 and the external electronic device 500 and between the second UWB module 342 and the external electronic device 500, the distances d therebetween. For example, the distances d may be determined by Equation 1.

The processor 310 may use a time difference of arrival (TDoA) scheme to measure the distance between the first UWB module 341 and the external electronic device 500. The processor 310 may designate the first UWB module 341 as a UWB tag and designate the external electronic device 500 as a UWB anchor, and may measure the distance therebetween based on the difference between the time when the first UWB module 341 transmits a data packet and the time when the external electronic device 500 receives the data packet. For example, the processor 310 may determine ToF as in Equation 2, based on the difference between a timestamp when the first UWB module 341 transmits a data packet and a timestamp when the external electronic device 500 receives the data packet and on a time corresponding to one timestamp. Further, the processor 310 may measure the distance between the second UWB module 342 and the external electronic device 500 in the same way.

The processor 310 may use a two-way ranging (TWR) scheme to measure the distance between the first UWB module 341 and the external electronic device 500. The processor 310 may designate the first UWB module 341 as a UWB tag and designate the external electronic device 500 as a UWB anchor, and may measure the distance therebetween based on the time taken for the first UWB module 341 to transmit data packet and receive a response from the external electronic device 500. The processor 310 may determine ToF as in Equation 3, based on the time ($T_p a$) taken for the first UWB module 341 to transmit a data packet and receive a response and the time ($T_{reply}$) for the external electronic device 500 to receive the data packet and transmit the response. The processor 310 may measure the distance between the second UWB module 342 and the external electronic device 500 in the same way.

The processor 310 may determine the direction of the user's gaze, based on the difference between the distance between the first UWB module 341 and the external electronic device 500 and the distance between the second UWB module 342 and the external electronic device 500. For example, when the difference between the distance between the first UWB module 341 and the external electronic device 500 and the distance between the second UWB module 342 and the external electronic device 500 has a value smaller than a predetermined value, the processor 310 may determine that the user's gaze is directed toward the external electronic device 500, and when the difference has a value equal to or greater than the predetermined value, the processor 310 may determine that the user's gaze is not directed toward the external electronic device 500.

The processor 310 may determine the direction of the user's gaze by using UWB communication between the first UWB module 341 and/or the second UWB module 342 and the external electronic device 500.

The processor 310 may measure a relative angle between the first UWB module 341 and/or the second UWB module 342 and the external electronic device 500, based on communication signals from the first UWB module 341 and/or the second UWB module 342 and the external electronic device 500. According to an embodiment, the first UWB module 341 and/or the second UWB module 342 may include at least two UWB antennas.

The processor 310 may use an angle-of-arrival (AoA) scheme to measure the relative angle between the first UWB module 341 and/or the second UWB module 342 and the external electronic device 500. The processor 310 may acquire a signal transmitted from the external electronic device 500 through the first antenna and the second antenna of the first UWB module 341 and/or the second UWB module 342. Each of the first antenna and the second antenna of the first UWB module 341 and/or the second UWB module 342 may acquire the arrival time and phase of a signal. The processor 310 may measure the relative angle between the first UWB module 341 and/or the second UWB module 342 and the external electronic device 500, based on differences in arrival times and phases of a signal, acquired by the first antenna and the second antenna of the first UWB module 341 and/or the second UWB module 342. For example, the processor 310 may determine the relative angle θ by Equation 4.

Herein, d is the distance between the first antenna and the second antenna, λ is a wavelength, and a is the difference between a signal phase acquired by the first antenna and a signal phase acquired by the second antenna.

The processor 310 may determine the direction of the user's gaze, based on the relative angle between the first UWB module 341 and/or the second UWB module 342 and the external electronic device 500. For example, when there is one first UWB module 341 and/or second UWB module 342, the processor 310 may determine that the relative angle is the direction of the user's gaze. When there are at least two first UWB modules 341 and/or second UWB modules 342, the processor 310 may determine that the user's gaze is directed toward the external electronic device 500, provided that the difference between relative angles to the external electronic device 500 that are measured by the first UWB module 341 and the second UWB module 342, respectively, has a value smaller than a predetermined value, and may determine that the user's gaze is not directed toward the external electronic device 500, provided that the difference between the angles has a value equal to or greater than the predetermined value.

The processor 310 may determine the gaze direction by using communication between the first UWB module 341 or the second UWB module 342 and a UWB accessory 510 connected to the external electronic device 500. For example, in the case of the external electronic device 500 which does not include a UWB module, the UWB accessory 510 may be connected to the external electronic device 500 to perform UWB communication with the electronic device 300.

In operation 430, the processor 310 may select an external electronic device.

The processor 310 may select an external electronic device 500, based on the direction of the user's gaze. For example, the processor 310 may select the external electronic device 500 positioned in the direction of the user's gaze.

In response to determining the direction of the user's gaze based on the difference between the distance between the first UWB module 341 and the external electronic device 500 and the distance between the second UWB module 342 and the external electronic device 500, the processor 310 may select the external electronic device 500, wherein the difference between the distance between the first UWB module 341 and the external electronic device 500 and the distance between the second UWB module 342 and the external electronic device 500 has a value smaller than a predetermined value. For example, when multiple external electronic devices 500 are recognized, the processor 310 may select an external electronic device 500 wherein the difference between the distance between the first UWB module 341 and the external electronic device 500 and the distance between the second UWB module 342 and the external electronic device 500 is smaller.

For example, when there is one UWB module 340, and when the direction of the user's gaze is determined based on the relative angle between the UWB module 340 and an external electronic device 500, the processor 310 may select the external electronic device 500 provided that the relative angle is within a designated range from 90 degrees. When multiple external electronic devices 500 are recognized, the processor 310 may select an external electronic device 500 forming a relative angle closer to 90 degrees.

When there are at least two first UWB modules 341 and/or second UWB modules 342, and when the direction of the user's gaze is determined based on the relative angles between the first UWB module 341 and/or the second UWB module 342 and external electronic devices 500, the processor 310 may select an external electronic device 500 wherein the difference between relatives angles between the external electronic device 500 and the first UWB module 341 and the second UWB module 342, measured by the first UWB module 341 and the second UWB module 342, has a value smaller than a predetermined value. For example, when multiple external electronic devices 500 are recognized, the processor 310 may select an external electronic device 500 wherein the difference between the relative angles is smaller.

When multiple external electronic devices 501 and 502 are recognized, the processor 310 may select the external electronic device 501 or 502, based on the user's motion. For example, the processor 310 may first select a first external electronic device 501 positioned at a shorter relative distance, and may then select a second external electronic device 502, based on the user's motion (e.g., a motion of shaking the head left and right).

In operation 440, the processor 310 may determine the user's motion.

The processor 310 may acquire a signal related to the user's motion from the motion sensor 330. For example, the motion sensor 330 may include the acceleration sensor 331 and/or the gyro sensor 332, and may measure a signal related to the user's motion.

The processor 310 may acquire, based on the signal acquired from the motion sensor 330, information about the user's motion. For example, the processor 310 may acquire, based on the signal measured by the motion sensor 330, information about the user's motion such as a stopped state, a motion of nodding the head up and down, or a motion of shaking the head left and right.

When data related to the signal acquired from the motion sensor 330 has a value smaller than a predetermined value, the processor 310 may determine that the user's motion is in a stopped state. The processor 310 may also determine that the user's motion is in the stopped state when acceleration data acquired from the acceleration sensor 331 has a value smaller than a predetermined value and angular speed data acquired from the gyro sensor 332 has a value smaller than the predetermined value.

When the data related to the signal acquired from the motion sensor 330 is included in a designated range, the processor 310 may determine that the user's motion is a motion of nodding the head up and down. For example, when the rotation angle of a pitch axis, acquired from the acceleration sensor 331, is included in the designated range, when the rotation angles of roll and yaw axes are smaller than a predetermined value, and when pitch axis angular speed data acquired from the gyro sensor 332 has a value equal to or greater than a predetermined value, the processor 310 may determine that the user's motion is a motion of nodding the head.

When the data related to the signal acquired from the motion sensor 330 is included in a designated range, the processor 310 may determine that the user's motion is a motion of shaking the head left and right. In another example, when the rotation angle of a yaw axis, acquired from the acceleration sensor 331, is included in the designated range, when the rotation angles of roll and pitch axes are smaller than a predetermined value, and when yaw-axis angular speed data acquired from the gyro sensor 332 has a value equal to or greater than a predetermined value, the processor 310 may determine that the user's motion is a motion of shaking the head left and right.

The processor 310 may acquire information about the user's motion, based on data measured by the first UWB module 341 and/or the second UWB module 342. For example, the processor 310 may acquire information about the user's motion such as a motion of moving close to or away from the external electronic device 500, based on the relative distance between the external electronic device 500 and the first UWB module 341 and/or the second UWB module 342, measured by the first UWB module 341 and/or the second UWB module 342.

When the relative distance acquired from the first UWB module 341 and/or the second UWB module 342 decreases, the processor 310 may determine the user's motion to be a motion of moving closer, and when the relative distance increases, the processor 310 may determine the user's motion to be a motion of moving farther away.

In operation 450, the processor 310 may control the external electronic device.

The processor 310 may generate a control command, based on the user's motion. For example, when the user's motion is in a stopped state, the processor 310 may generate a command which causes the external electronic device 500 to repeatedly perform a designated operation during the time of the stopped state. In another example, the processor 310 may generate a command which causes a channel number output from the external electronic device 500 to be repeatedly changed.

When the user's motion is a motion of nodding the head up and down, the processor 310 may generate a command which causes the external electronic device 500 to perform a selected function. The processor 310 may display, based on selecting the external electronic device 500, a notification regarding whether to perform mirroring to the external electronic device 500 on the external electronic device 500, and may perform a function of mirroring to the external electronic device 500 in response to the user's motion of nodding the head up and down.

When the user's motion is a motion of shaking the head left and right, the processor 310 may generate a command which causes the external electronic device 500 to stop or cancel a selected function. For example, the processor 310 may display, based on selecting the external electronic device 500, a notification regarding whether to perform mirroring to the external electronic device 500 on the external electronic device 500, and may cancel a function of mirroring to the external electronic device 500 in response to the user's motion of shaking the head left and right.

The processor 310 may control the external electronic device 500, based on a change in the distance between the user and the external electronic device 500. For example, the processor 310 may generate, in response to the user's motion of moving away from the external electronic device 500, a command which reduces a speaker volume output from the external electronic device 500. For example, the processor 310 may generate, in response to the user's motion of moving close to the external electronic device 500, a command which increases a speaker volume output from the external electronic device 500.

The processor 310 may generate a control command, based on a gesture such as touching or swiping by the user. For example, the processor 310 may perform a media rewind function in response to a touch input which has been made from the user through a touch sensor included in a first unit (e.g., the first unit 201 in FIG. 2A, the first device 203 in FIG. 2B, or the first hinge part 240-1 in FIG. 2C), and may perform a media fast-forward function in response to a touch input made through a touch sensor included in a second unit (e.g., the second unit 202 in FIG. 2A, the second device 204 in FIG. 2B, or the second hinge part 240-2 in FIG. 2C). For example, the processor 310 may generate a control command, based on the number of touches which have been input by the user through the touch sensor included in the first unit (e.g., the first unit 201 in FIG. 2A, the first device 203 in FIG. 2B, or the first hinge part 240-1 in FIG. 2C) or through the touch sensor included in the second unit (e.g., the second unit 202 in FIG. 2A, the second device 204 in FIG. 2B, or the second hinge part 240-2 in FIG. 2C). For example, the processor 310 may perform a media playback pause function in response to one touch, may perform a previous media playback function in response to two touches, and may perform a next media playback function in response to three touches. For example, the processor 310 may perform control including at least one or a combination of at least two among multimedia playback, pause, next media playback, and previous media playback in response to a swipe input performed through the touch sensor included in the first unit (e.g., the first unit 201 in FIG. 2A, the first device 203 in FIG. 2B, or the first hinge part 240-1 in FIG. 2C) or through the touch sensor included in the second unit (e.g., the second unit 202 in FIG. 2A, the second device 204 in FIG. 2B, or the second hinge part 240-2 in FIG. 2C).

The processor 310 may directly and/or indirectly transmit a control command to the external electronic device 500 through the communication module 320. For example, the processor 310 may control the communication module 320 such that the communication module 320 transmits a control command to the external electronic device 500 through a network (e.g., the first network 198 and/or the second network 199 in FIG. 1).

The processor 310 may control the communication module 320 such that the communication module 320 transmits a control command to a server and/or an external mobile device (e.g., a smartphone) through a network. For example, the server and/or the external mobile device, which has received the control command from the electronic device 300, may transmit the command to the external electronic device 500.

The processor 310 may receive, from the user, a control command to be transmitted to the external electronic device 500. For example, the processor 310 may provide, to the user, a user interface (UI) in which control commands corresponding to the user's motions can be input, may receive control commands that have been input from the user, and may store the control commands in a memory. For example, the processor 310 may acquire, from the memory, a control command corresponding to a recognized motion of the user, and may transmit the acquired control command to the external electronic device 500.

The electronic device 300 may use the communication module 320 to be connected to a mobile device (e.g., a smartphone) through a short-range network (e.g., Bluetooth or Wi-Fi). For example, the processor 310 may use the communication module 320 to transmit a control command to the mobile device and/or receive, from the mobile device, a signal causing the electronic device 300 to output an audio of media.

The processor 310 may transmit information about the selected external electronic device 500 to the mobile device through the communication module 320. For example, the mobile device may be connected to the external electronic device 500 through a short-range network (e.g., Bluetooth or Wi-Fi). For example, the mobile device may transmit, to the external electronic device 500, a signal causing the external electronic device 500 to output an image and/or an audio of media.

The mobile device may select a device for outputting an audio and/or an image of media, in response to receiving the information about the selected external electronic device 500 from the electronic device 300, and may transmit an output signal to the selected device. For example, in response to receiving the information about the selected external electronic device 500 from the electronic device 300, the mobile device may transmit, to the electronic device 300, a signal that causes the electronic device 300 to output an audio of media, and may transmit, to the external electronic device 500, a signal that causes the external electronic device 500 to output an image of media. In another example, in response to receiving the information about the selected external electronic device 500 from the electronic device 300, the mobile device may transmit, to the external electronic device 500, a signal causing the external electronic device 500 to output an audio and an image of media. In this case, for example, the mobile device may transmit information about the electronic device 300 (e.g., information about the electronic device 300 registered on an account) to the external electronic device 500 such that the electronic device 300 is connected to the external electronic device 500 through a short-range network (e.g., Bluetooth or Wi-Fi). In this case, the external electronic device 500 may be connected, based on the information about the electronic device 300, to the electronic device 300 through the short-range network (e.g., Bluetooth or Wi-Fi).

Figure 5A:
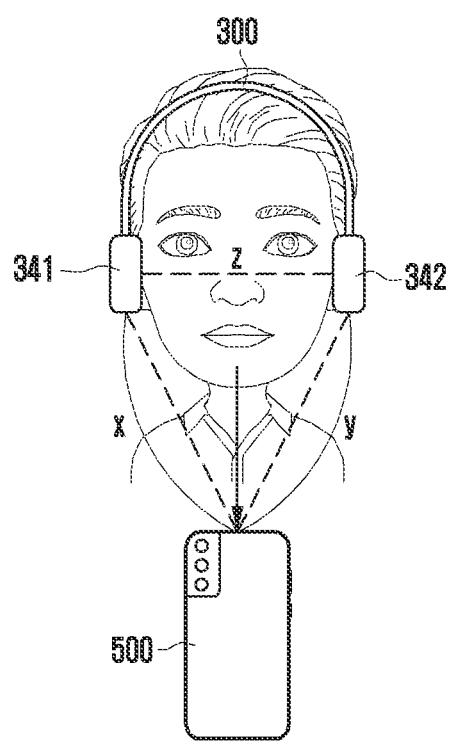
FIGS. 5A, 5B, and 5C illustrate operations of determining the direction of a user's gaze by an electronic device according to various embodiments of the disclosure.
Figure 5B:
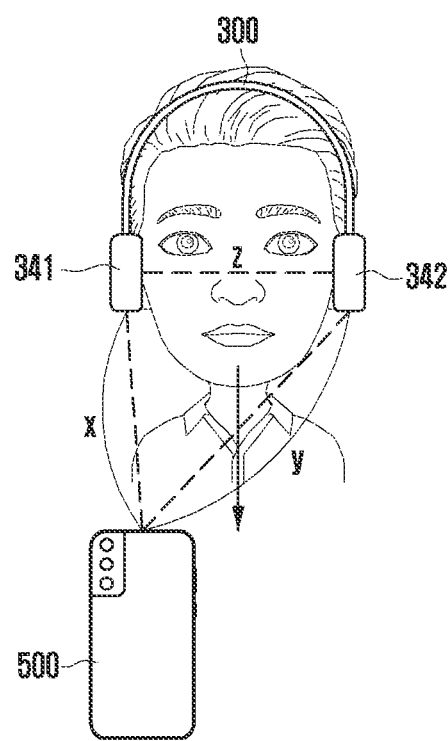
Figure 5C:
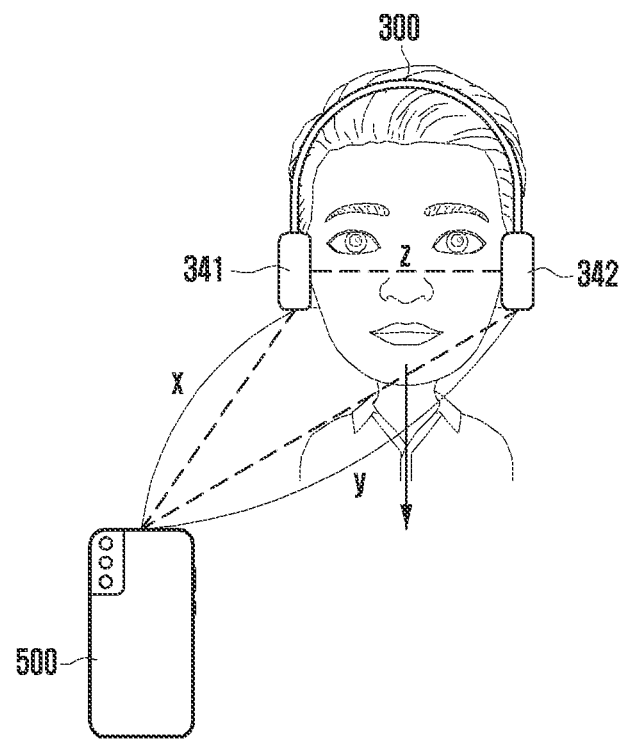

FIGS. 5A, 5B, and 5C illustrate operations of determining the direction of a user's gaze by an electronic device according to an embodiment of the disclosure.

FIG. 5A shows an example in which a user's gaze is directed toward the external electronic device 500, and FIGS. 5B and 5C show examples in which the user's gaze is not directed toward the external electronic device 500.

The first UWB module 341 may be positioned in the right unit of the electronic device 300 (e.g., the headset), and the second UWB module 342 may be positioned in the left unit of the electronic device 300. For example, the electronic device 300 is worn on the user's head, the right unit including the first UWB module 341 is worn on the right ear, and the left unit including the second UWB module 342 is worn on the left ear. Therefore, in an imaginary straight line z connecting the first UWB module 341 to the second UWB module 342, the direction of the user's gaze may match a direction perpendicular to the imaginary straight line with reference to the center point of the straight line.

The electronic device 300 may determine the direction of the user's gaze by using UWB communication between the first UWB module 341, the second UWB module 342, and the external electronic device 500.

The electronic device 300 may measure, based on the time of flight (ToF) between the first UWB module 341 and the external electronic device 500 and between the second UWB module 342 and the external electronic device 500, the distance x between the first UWB module 341 and the external electronic device 500 and the distance y between second UWB module 342 and the external electronic device 500. The distances x and y therebetween may be determined by Equation 1.

The electronic device 300 may use a time difference of arrival (TDoA) scheme to measure the distance x between the first UWB module 341 and the external electronic device 500. The electronic device 300 may designate the first UWB module 341 as a UWB tag and designate the external electronic device 500 as a UWB anchor, and may measure the distance x therebetween based on the difference between the time when the first UWB module 341 transmits a data packet and the time when the external electronic device 500 receive the data packet. The electronic device 300 may determine ToF as in Equation 2, based on the time difference between a timestamp when the first UWB module 341 transmits a data packet and a time stamp when the external electronic device 500 receives the data packet. Further, the electronic device 300 may measure the distance y between the second UWB module 342 and the external electronic device 500 in the same way.

The electronic device 300 may use a two-way ranging (TWR) scheme to measure the distance x between the first UWB module 341 and the external electronic device 500. Specifically, the electronic device 300 may designate the first UWB module 341 as a UWB tag and designate the external electronic device 500 as a UWB anchor, and may measure the distance x therebetween based on the time taken for the first UWB module 341 to transmit a data packet and receive a response from the external electronic device 500. For example, the electronic device 300 may determine ToF as in Equation 3, based on a time $T_{poll}$ taken for the first UWB module 341 to transmit a data packet and receive a response and a time $T_{reply}$ taken for the external electronic device 500 to receive the data packet and transmit the response. The electronic device 300 may measure the distance y between the second UWB module 342 and the external electronic device 500 in the same way.

The electronic device 300 may determine the direction of the user's gaze, based on the difference between the distance x between the first UWB module 341 and the external electronic device 500 and the distance y between the second UWB module 342 and the external electronic device 500. For example, when the difference between x and y has a value smaller than a predetermined value, the electronic device 300 may determine that the user's gaze is directed toward the external electronic device 500, and, when the difference between x and y has a value equal to or greater than the predetermined value, the electronic device 300 may determine that the user's gaze is not directed toward the external electronic device 500.

Referring to FIG. 5A, the user's gaze is directed toward the external electronic device 500, and x and y have the same length. As a result, the difference between x and y is 0.

Referring to FIGS. 5B and 5C, the user's gaze is not directed toward the external electronic device 500, and the external electronic device 500 may be positioned at the right side of the user' gaze (the user's viewpoint). Thus, the distance x between the first UWB module 341 and the external electronic device 500 is shorter than the distance y between the second UWB module 342 and the external electronic device 500. Therefore, a difference is caused between x and y, and the difference increases as the external electronic device 500 is farther away from the user's gaze. For example, the difference between x and y in FIG. 5C is greater than the difference between x and y in FIG. 5B.

Figure 6A:
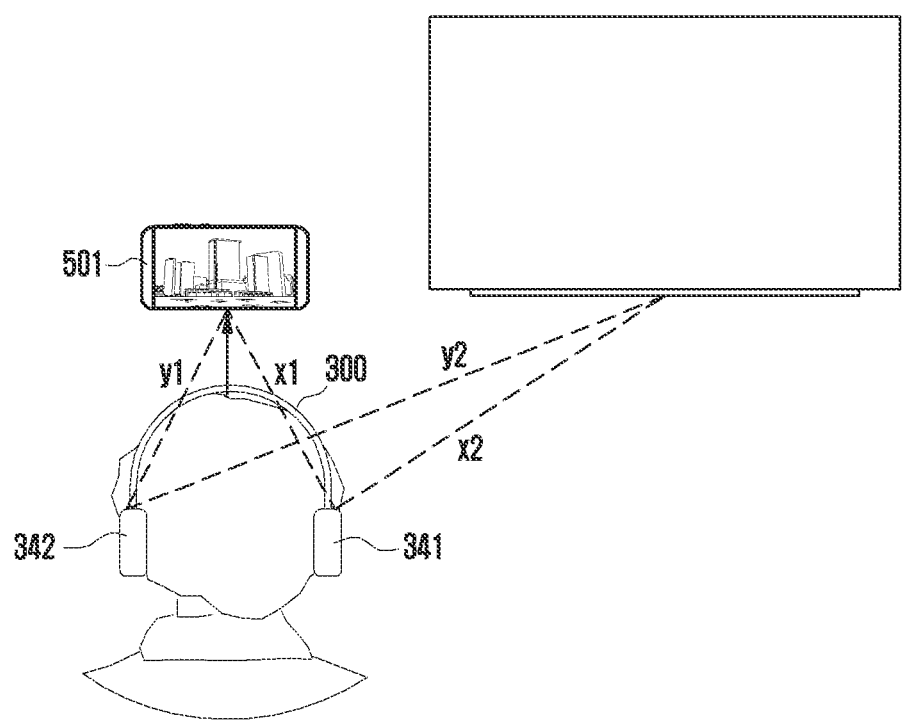
FIGS. 6A and 6B illustrates an operation of selecting an external electronic device by an electronic device according to various embodiments of the disclosure.
Figure 6B:
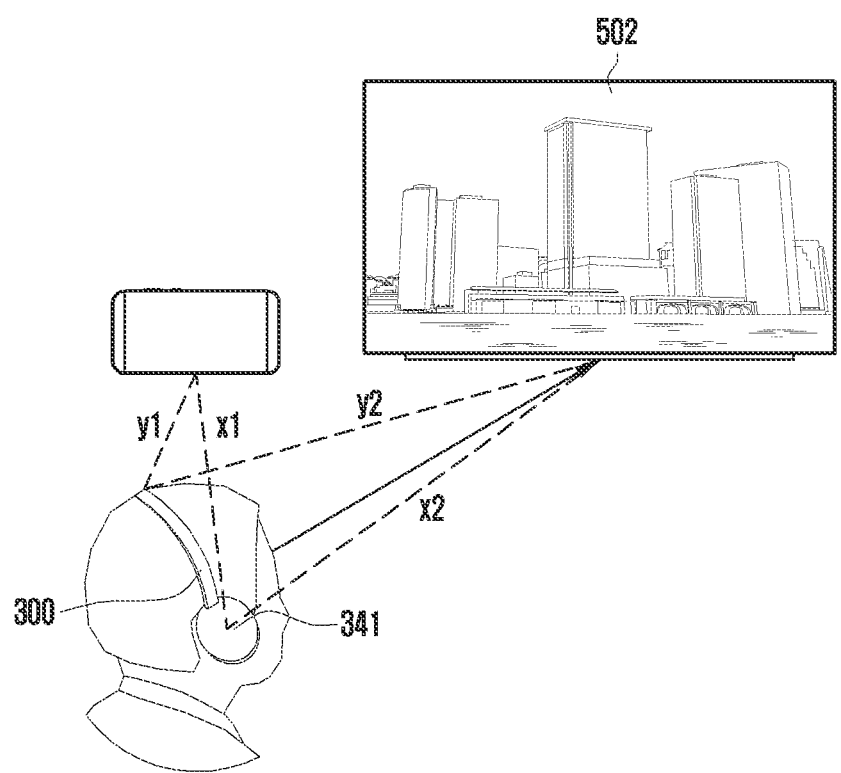

FIGS. 6A and 6B illustrate operations of selecting an external electronic device by an electronic device according to an embodiment of the disclosure.

FIG. 6A illustrates an example in which the electronic device 300 selects a first external electronic device 501, and FIG. 6B illustrates an example in which the electronic device 300 selects a second external electronic device 502.

The electronic device 300 may select, based on the direction of a user's gaze, the external electronic device 501 or 502. For example, the electronic device 300 may select the external electronic device 501 or 502 positioned in the direction of the user's gaze.

In response to determining the direction of the user's gaze based on differences between the distances x1 and x2 between a first UWB module 341 and the external electronic device 501 and 502 and the distances y1 and y2 between a second UWB module 342 and the external electronic devices 501 and 502, the electronic device 300 may select the external electronic device 501 or 502 which corresponds to the difference having a value smaller than a predetermined value among the differences between the distances x1 and x2 between the first UWB module 341 and the external electronic device 501 and 502 and the distances y1 and y2 between the second UWB module 342 and the external electronic devices 501 and 502.

When multiple external electronic devices 501 and 502 are recognized, the electronic device 300 may select the external electronic device 501 or 502 which corresponds to a smaller difference among the differences between the distances x1 and x2 between the first UWB module 341 and the external electronic device 501 and 502 and the distances y1 and y2 between the second UWB module 342 and the external electronic devices 501 and 502.

Referring to FIG. 6A, the user's gaze is directed toward the first external electronic device 501, and thus x1 and y1 to the first external electronic device 501 have an identical value (x1=y1), but x2 and y2 to the second external electronic device 502 have different values (y2>x2). Therefore, the electronic device 300 may select |the first external electronic device 501 which corresponds to a smaller distance difference (|x1−y1|<|x2−y2|).

Referring to FIG. 6B, the user's gaze is directed toward the second external electronic device 502, and thus x2 and y2 to the second external electronic device 502 have an identical value (x2=y2), but x1 and y1 to the first external electronic device 501 have different values (x1>y1). Therefore, the electronic device 300 may select the second external electronic device 502 which corresponds to a smaller distance difference (|x1−y1|>|x2−y2|).

Figure 7A:
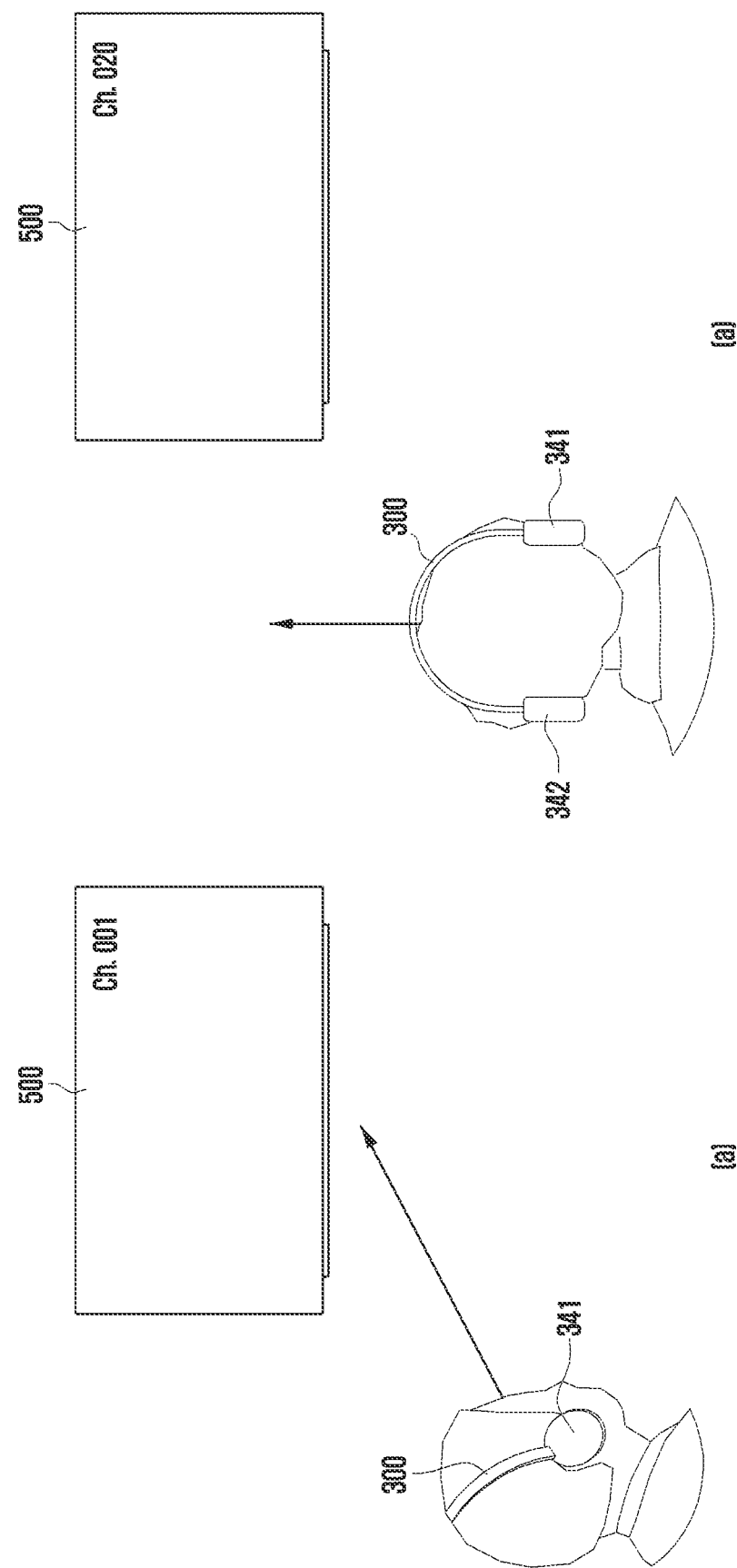

FIGS. 7A, 7B, and 7C illustrate an operation of controlling an external electronic device by an electronic device 300 according to various embodiments of the disclosure.

FIG. 7A illustrates an example of an operation in which the electronic device 300 controls the external electronic device 500 in response to a user's motion (stopped state) of gazing at the external electronic device 500.

The electronic device 300 may acquire a signal related to the user's motion from the motion sensor 330. For example, the motion sensor 330 may include the acceleration sensor 331 and/or the gyro sensor 332, and may measure the signal related to the user's motion.

The electronic device 300 may acquire information about the user's motion, based on the signal acquired from the motion sensor 330. For example, when data related to the signal acquired from the motion sensor 330 has a value smaller than a predetermined value, the electronic device 300 may determine that the user's motion is a stopped state. For example, when acceleration variation data acquired from the acceleration sensor 331 has a value smaller than a predetermined value and when angular speed data acquired from the gyro sensor 332 has a value smaller than the predetermined value, the electronic device 300 may determine that the user's motion is in a stopped state.

The electronic device 300 may transmit, based on the user's motion, a control command to the external electronic device 500. For example, when the user's motion is in the stopped state, the electronic device 300 may transmit, to the external electronic device 500, a command to change a channel output from the external electronic device 500 during the time of the stopped state.

Referring to parts (a) and (b) of FIG. 7A, when the user's motion is in the stopped state by gazing at the external electronic device 500, the electronic device 300 may transmit, to the external electronic device 500, a command to repeatedly change the channel of the external electronic device 500.

FIG. 7B illustrates an example of an operation in which an electronic device controls the external electronic device 500 in response to the use's motion of nodding the head up and down or shaking the head left and right according to an embodiment of the disclosure.

Referring to FIG. 7B, the processor 310 may acquire a signal related to the user's motion from the motion sensor 330. For example, the motion sensor 330 may include the acceleration sensor 331 and/or the gyro sensor 332, and may measure the signal related to the user's motion.

The processor 310 may acquire information about the user's motion, based on the signal acquired from the motion sensor 330.

For example, when data related to the signal acquired from the motion sensor 330 is included in a designated range, the processor 310 may determine that the user's motion is a motion of nodding the head up and down. For example, when a rotation angle of a pitch axis, acquired from the motion sensor 330, is included in a designated range, and rotation angles of roll and yaw axes are smaller than a predetermined value, and when pitch-axis angular speed data acquired from the gyro sensor 332 has a value equal to or greater than the predetermined value, the processor 310 may determine that the user's motion is a motion of nodding the head up and down.

When the data related to the signal acquired from the motion sensor 330 is included in the designated range, the processor 310 may determine that the user's motion is a motion of shaking the head left and right. For example, when a rotation angle of the yaw axis, acquired from the acceleration sensor 331, is included in the designated range and rotation angles of the roll and pitch axes are smaller than the predetermined value, and when yaw-axis angular speed data acquired from the gyro sensor 332 has a value equal to or greater than the predetermined value, the processor 310 may determine that the user's motion is a motion of shaking the head left and right.

The electronic device 300 may transmit, based on the user's motion, a control command to the external electronic device 500.

Referring to part (a) of FIG. 7B, when the user's motion is a motion of nodding the head up and down, the electronic device 300 may transmit, to the external electronic device 500, a command which causes the external electronic device 500 to perform a selected function (e.g., "End TV?"—Yes in part (a) of FIG. 7B).

Referring to part (b) of FIG. 7B, when the user's motion is a motion of shaking the head left and right, the electronic device 300 may transmit, to the external electronic device 500, a command which causes the external electronic device 500 to stop the selected function (e.g., "End TV?"—No in part (a) of FIG. 7B).

FIG. 7C illustrates an example of an operation in which the electronic device 300 controls a configuration related to the external electronic device 500 in response to the user's motion of moving close to or away from the external electronic device 500 according to an embodiment of the disclosure.

The processor 310 may acquire information about the user's motion, based on a signal measured by the first UWB module 341 and/or the second UWB module 342. For example, the processor 310 may acquire, based on the relative distance to the external electronic device 500, measured by the first UWB module 341 and/or the second UWB module 342, information about the user's motion such as a motion of moving close to or away from the external electronic device 500. For example, when the relative distance acquired from the first UWB module 341 and/or the second UWB module 342 decreases, the processor 310 may determine that the user's motion is a motion of moving closer, and when the relative distance increases, the processor 310 may determine that the user's motion is a motion of moving farther away.

The electronic device 300 may control, based on the user's motion, a configuration related to the external electronic device 500.

Referring to part (a) of FIG. 7C, when the user's motion is a motion of moving away from the external electronic device 500, the electronic device 300 may control a speaker of the electronic device 300 to reduce a volume which is output from the speaker and corresponds to media output from the external electronic device 500.

Referring to part (b) of FIG. 7C, when the user's motion is a motion of moving close to the external electronic device 500, the electronic device 300 may control the speaker of the electronic device 300 to increase a volume which is output from the speaker and corresponds to media output from the external electronic device 500.

According to another embodiment of the disclosure, when the user's motion is a motion of moving close to the external electronic device 500, the electronic device 300 may transmit, to the external electronic device 500, a command to change a configuration related to a screen output by the external electronic device 500 (e.g., a command to increase resolution or brightness).

When the user's motion is a motion of moving away from the external electronic device 500, the electronic device 300 may transmit, to the external electronic device 500, a command to change a configuration related to a screen output by the external electronic device 500 (e.g., a command to reduce resolution or brightness).

Figure 8A:
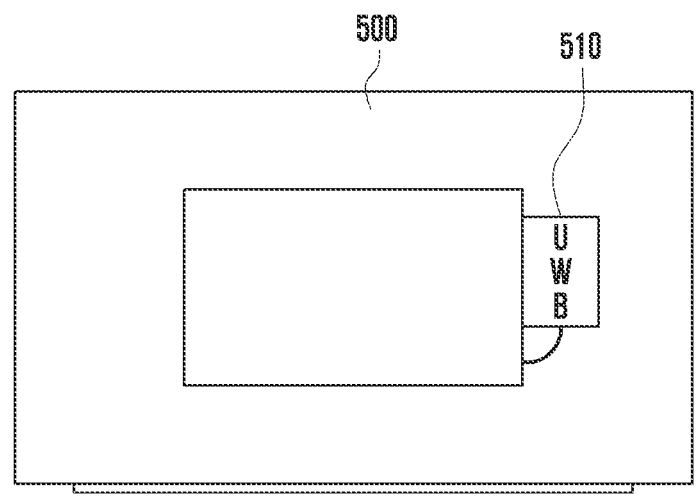
FIGS. 8A and 8B illustrates an external electronic device according to various embodiments of the disclosure.
Figure 8B:
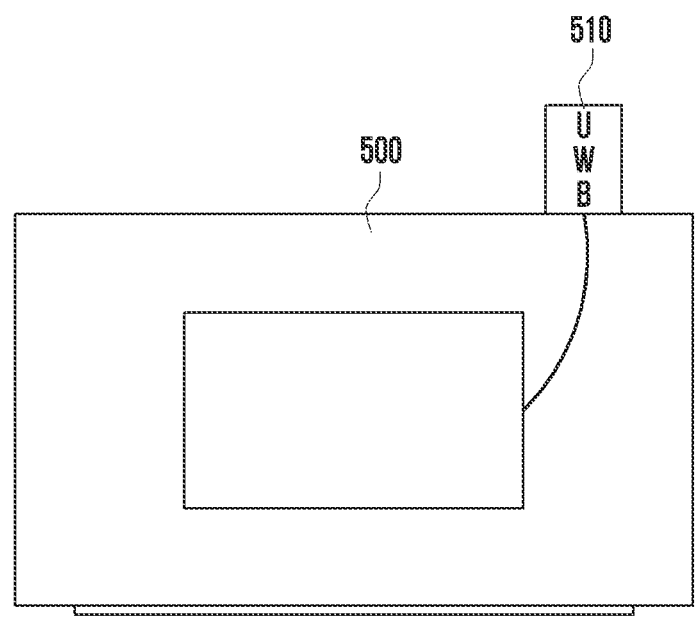

FIGS. 8A and 8B illustrate an external electronic device 500 according to various embodiments of the disclosure.

Referring to FIGS. 8A and 8B, the external electronic device 500 according to an embodiment may include a UWB module. The external electronic device 500 according to another embodiment may not include a UWB module.

Referring to FIGS. 8A and 8B, the external electronic device 500, which does not include a UWB module, may perform USB communication with the electronic device 300 by connecting a UWB accessory 510 to the external electronic device 500.

The UWB accessory 510 may be attached to the rear surface of the external electronic device 500 as illustrated in FIG. 8A, and/or may be attached to the top surface of the external electronic device 500 as illustrated in FIG. 8B. Coupling between the UWB accessory 510 and the external electronic device 500 is not limited to illustrations in FIGS. 8A and 8B, and the external electronic device 500 capable of performing various other types of UWB communication may be a subject matter of the disclosure.

An electronic device 300 according to various embodiments of the disclosure may include a communication module 320, a first UWB module 341, a second UWB module 342, and a processor 310 operatively connected to the communication module 320, the first UWB module 341, and the second UWB module 342, wherein the processor 310 determines the direction of a user's gaze, based on data acquired from the first UWB module 341 and data acquired from the second UWB module 342, selects at least one from among external electronic devices 500 positioned in the gaze direction, and sends, through the communication module 320, a request to the selected external electronic device 500 to output media.

The electronic device 300 according to various embodiments of the disclosure may further include a motion sensor 330 configured to measure data related to the user's motion, wherein the processor 310 determines the user's motion, based on data acquired from the motion sensor 330, generates a control command based on the user's motion, and transmits, based on the control command, the control command to the external electronic device 500 through the communication module 320.

In the electronic device 300 according to various embodiments of the disclosure, the processor 310 may determine the direction of the user's gaze, based on the data acquired from the first UWB module 341 and the data acquired from the second UWB module 342, in response to determining the user's motion to be in a stopped state, based on the data acquired from the motion sensor 330.

In the electronic device 300 according to various embodiments of the disclosure, the processor 310 may acquire the distance between the first UWB module 341 and the second UWB module 342, and may determine that a direction perpendicular to an imaginary straight line connecting the first UWB module 341 to the second UWB module 342 with reference to center points of the first UWB module 341 and the second UWB module 342 is the direction of the user's gaze.

In the electronic device 300 according to various embodiments of the disclosure, the processor 310 may acquire the relative distance between the first UWB module 341 and the external electronic device 500 and the relative distance between the second UWB module 342 and the external electronic device 500, and may determine the direction of the external electronic device 500 to be the direction of the user's gaze, when the difference between the relative distance between the first UWB module 341 and the external electronic device 500 and the relative distance between the second UWB module 342 and the external electronic device 500 has a value smaller than a predetermined value.

In the electronic device 300 according to various embodiments of the disclosure, the processor 310 may acquire the relative angle between the first UWB module 341 and the external electronic device 500, and may determine the direction of the external electronic device 500 to be the direction of the user's gaze, when the relative angle between the first UWB module 341 and the external electronic device 500 is within a designated range from 90 degrees.

In the electronic device 300 according to various embodiments of the disclosure, the processor 310 may acquire the relative angle between the first UWB module 341 and the external electronic device 500 and the relative angle between the second UWB module 342 and the external electronic device 500, and may determine the direction of the external electronic device 500 to be the direction of the user's gaze, when the difference between the relative angle between the first UWB module 341 and the external electronic device 500 and the relative angle between the second UWB module 342 and the external electronic device 500 has a value smaller than a predetermined value.

In the electronic device 300 according to various embodiments of the disclosure, in response to the presence of multiple external electronic devices 500 positioned in the gaze direction, the processor 310 may select an external electronic device 500 from among the external electronic devices 500, wherein the difference between the relative distance between the first UWB module 341 and the external electronic device 500 and the relative distance between the second UWB module 342 and the external electronic device 500 is smaller.

The electronic device 300 according to various embodiments of the disclosure may further include a touch sensor, wherein the processor 310 determines, based on data acquired from the motion sensor 330 or the touch sensor, the user's motion including a stopped motion, a motion of nodding the head up and down, a motion of shaking the head left and right, a touching motion, and a swiping motion.

In the electronic device 300 according to various embodiments of the disclosure, the processor 310 may generate, when the user's motion is a motion of nodding the head up and down, a control command causing the external electronic device 500 to perform a selected function, and may generate, when the user's motion is a motion of shaking the head left and right, a control command to cancel the selected function of the external electronic device 500.

In the electronic device 300 according to various embodiments of the disclosure, the processor 310 may determine, based on the data acquired from the first UWB module 341 and the data acquired from the second UWB module 342, the user's motion including a motion of moving close to the external electronic device 500 and a motion of moving away from the external electronic device 500.

An electronic device 300 connected to a mobile device configured to output media, according to various embodiments of the disclosure, may include a communication module 320, a first UWB module 341, a second UWB module 342, and a processor 310 operatively connected to the communication module 320, the first UWB module 341, and the second UWB module 342, wherein the processor 310 determines the direction of a user's gaze, based on data acquired from the first UWB module 341 and data acquired from the second UWB module 342, selects at least one from among external electronic devices 500 positioned in the gaze direction, and sends, through the communication module 320, a request to the selected external electronic device 500 to output the media output from the mobile device.

A method for operating an electronic device 300, according to various embodiments of the disclosure, may include determining the direction of a user's gaze, based on data acquired from a first UWB module 341 and data acquired from a second UWB module 342, selecting at least one from among external electronic devices 500 positioned in the gaze direction, and sending a request to the selected external electronic device 500 to output media.

The method for operating the electronic device 300, according to various embodiments of the disclosure, may include determining the user's motion, based on data acquired from a motion sensor, generating a control command, based on the user's motion, and transmitting the control command to the external electronic device 500, based on the control command.

The method for operating the electronic device 300, according to various embodiments of the disclosure, may include determining the direction of the user's gaze, based on the data acquired from the first UWB module 341 and the data acquired from the second UWB module 342, when the user's motion is determined to be in a stopped state, based on the data acquired from the motion sensor 330.

The method for operating the electronic device 300, according to various embodiments of the disclosure, may include acquiring the distance between the first UWB module 341 and the second UWB module 342, and determining that a direction perpendicular to an imaginary straight line connecting the first UWB module 341 to the second UWB module 342 with reference to center points of the first UWB module 341 and the second UWB module 342 is the direction of the user's gaze.

The method for operating the electronic device 300, according to various embodiments of the disclosure, may include acquiring the relative distance between the first UWB module 341 and the external electronic device 500 and the relative distance between the second UWB module 342 and the external electronic device 500, and determining the direction of the external electronic device 500 to be the direction of the user's gaze, when the difference between the relative distance between the first UWB module 341 and the external electronic device 500 and the relative distance between the second UWB module 342 and the external electronic device 500 has a value smaller than a predetermined value.

The method for operating the electronic device 300, according to various embodiments of the disclosure, may include acquiring the relative angle between the first UWB module 341 and the external electronic device 500, and determining the direction of the external electronic device 500 to be the direction of the user's gaze, when the relative angle between the first UWB module 341 and the external electronic device 500 is within a predetermined range from 90 degrees.

The method for operating the electronic device 300, according to various embodiments of the disclosure, may include acquiring the relative angle between the first UWB module 341 and the external electronic device 500 and the relative angle between the second UWB module 342 and the external electronic device 500, and determining the direction of the external electronic device 500 to be the direction of the user's gaze, when the difference between the relative angle between the first UWB module 341 and the external electronic device 500 and the relative angle between the second UWB module 342 and the external electronic device 500 has a value smaller than a predetermined value.

The method for operating the electronic device 300, according to various embodiments of the disclosure, may include selecting, in response to the presence of multiple external electronic devices 500 positioned in the gaze direction, an external electronic device 500 from among the external electronic devices 500, wherein the difference between the relative distance between the first UWB module 341and the external electronic device 500 and the relative distance between the second UWB module 342 and the external electronic device 500 is smaller.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
communication circuitry
first ultra-wideband (UWB) circuitry;
second UWB circuitry; and
a processor operatively connected to the communication circuitry module, the first UWB circuitry, and the second UWB circuitry; and
memory storing one or more programs including instructions which, when executed by the processor, cause the electronic device to:
determine a gaze direction of a user's gaze based on data acquired from the first UWB circuitry and data acquired from the second UWB circuitry,
select at least one external electronic device positioned in the gaze direction, and
based on a user's motion being determined after the selecting of the at least one external electronic device, transmit, to the at least one external electronic device through the communication circuitry, a request to output media.

2. The electronic device of claim 1, further comprising:
a motion sensor configured to measure data related to the user's motion,
wherein the instructions, when executed by the processor, further cause the electronic device to:
determine the user's motion based on data acquired from the motion sensor,
based on the user's motion, generate a control command, and
based on the control command, transmit, to the at least one external electronic device through the communication circuitry, the control command.

3. The electronic device of claim 2, wherein the instructions, when executed by the processor, further cause the electronic device to:
in response to determining the user's motion to be in a stopped state based on the data acquired from the motion sensor, determine the gaze direction of the user's gaze based on the data acquired from the first UWB circuitry and the data acquired from the second UWB circuitry.

4. The electronic device of claim 1, wherein the instructions, when executed by the processor, further cause the electronic device to:
acquire a distance between the first UWB circuitry and the second UWB circuitry, and
determine that a direction perpendicular to an imaginary straight line connecting the first UWB circuitry to the second UWB circuitry with reference to center points of the first UWB circuitry and the second UWB circuitry is the gaze direction of the user's gaze.

5. The electronic device of claim 1, wherein the instructions, when executed by the processor, further cause the electronic device to:
acquire a relative distance between the first UWB circuitry and the at least one external electronic device and a relative distance between the second UWB circuitry and the at least one external electronic device, and
determine a direction of the at least one external electronic device to be the gaze direction of the user's gaze based on a difference between the relative distance between the first UWB circuitry and the at least one external electronic device and the relative distance between the second UWB circuitry and the at least one external electronic device having a value smaller than a predetermined value.

6. The electronic device of claim 1, wherein the instructions, when executed by the processor, further cause the electronic device to:
acquire a relative angle between the first UWB circuitry and the at least one external electronic device, and
determine a direction of the at least one external electronic device to be the gaze direction of the user's gaze based on the relative angle between the first UWB circuitry and the at least one external electronic device being within a predetermined range from 90 degrees.

7. The electronic device of claim 1, wherein the instructions, when executed by the processor, further cause the processor is further configured to:
acquire a relative angle between the first UWB circuitry and the at least one external electronic device and a relative angle between the second UWB circuitry and the at least one external electronic device, and
determine a direction of the at least one external electronic device to be the gaze direction of the user's gaze based on a difference between the relative angle between the first UWB circuitry and the at least one external electronic device and the relative angle between the second UWB circuitry and the at least one external electronic device having a value smaller than a predetermined value.

8. The electronic device of claim 5,
wherein the instructions, when executed by the processor, further cause the electronic device to:
in response to a presence of multiple external electronic devices being positioned in the gaze direction, select an external electronic device from among the multiple external electronic devices, and
wherein a difference between a relative distance between the first UWB circuitry and the external electronic device and a relative distance between the second UWB circuitry and the external electronic device is smaller.

9. The electronic device of claim 2, further comprising:
a touch sensor,
wherein the instructions, when executed by the processor, further cause the electronic device to:
based on data acquired from the motion sensor or the touch sensor, determine the user's motion comprises one or more of a stopped motion, a motion of nodding a head up and down, a motion of shaking the head left and right, a touching motion, and a swiping motion.

10. The electronic device of claim 9, wherein the instructions, when executed by the processor, further cause the electronic device to:
in response to the user's motion being the motion of nodding the head up and down, generate a first control command causing the at least one external electronic device to perform a selected function, and
in response to the user's motion being the motion of shaking the head left and right, generate a second control command to cancel the selected function of the at least one external electronic device.

11. The electronic device of claim 1, wherein the instructions, when executed by the processor, further cause the electronic device to:
based on the data acquired from the first UWB circuitry and the data acquired from the second UWB circuitry, determine the user's motion comprises one or more of a motion of moving close to the at least one external electronic device and a motion of moving away from the at least one external electronic device.

12. An electronic device connected to a mobile device configured to output media, the electronic device comprising:
communication circuitry;
first ultra-wideband (UWB) circuitry;
second UWB circuitry; and
a processor operatively connected to the communication circuitry, the first UWB circuitry, and the second UWB circuitry; and
memory storing one or more programs including instructions which, when executed by the processor, cause the electronic device to:
determine a gaze direction of a user's gaze based on data acquired from the first UWB circuitry and data acquired from the second UWB circuitry,
select at least one external electronic device positioned in the gaze direction, and
based on a user's motion being determined after the selecting of the at least one external electronic device, transmit, to the at least one external electronic device through the communication circuitry, a request to output media being output from the mobile device.

13. A method for operating an electronic device, the method comprising:
determining a gaze direction of a user's gaze based on data acquired from first ultra-wideband (UWB) circuitry and data acquired from second UWB circuitry;
selecting at least one external electronic device positioned in the gaze direction; and
based on a user's motion being determined after the selecting of the at least one external electronic device, transmitting, to the at least one external electronic device, a request to output media.

14. The method of claim 13, further comprising:
determining the user's motion based on data acquired from a motion sensor;
based on the user's motion, generating a control command; and
based on the control command, transmitting the control command to the at least one external electronic device.

15. The method of claim 14, further comprising:
in response to the user's motion being determined to be in a stopped state based on the data acquired from the motion sensor, determining the gaze direction of the user's gaze based on the data acquired from the first UWB circuitry and the data acquired from the second UWB circuitry.

16. The method of claim 13, further comprising:
acquiring a distance between the first UWB circuitry and the second UWB circuitry; and
determining that a direction perpendicular to an imaginary straight line connecting the first UWB circuitry to the second UWB circuitry with reference to center points of the first UWB circuitry and the second UWB circuitry is the gaze direction of the user's gaze.

17. The method of claim 13, further comprising:
acquiring a relative distance between the first UWB circuitry and the at least one external electronic device and a relative distance between the second UWB circuitry and the at least one external electronic device; and
determining a direction of the at least one external electronic device to be the gaze direction of the user's gaze based on a difference between the relative distance between the first UWB circuitry and the at least one external electronic device and the relative distance between the second UWB circuitry and the at least one external electronic device having a value smaller than a predetermined value.

18. The method of claim 13, further comprising:
acquiring a relative angle between the first UWB circuitry and the at least one external electronic device; and
determining a direction of the at least one external electronic device to be the gaze direction of the user's gaze based on the relative angle between the first UWB circuitry and the at least one external electronic device being within a predetermined range from 90 degrees.

19. The method of claim 13, further comprising:
acquiring a relative angle between the first UWB circuitry and the at least one external electronic device and a relative angle between the second UWB circuitry and the at least one external electronic device; and
determining a direction of the at least one external electronic device to be the gaze direction of the user's gaze based on a difference between the relative angle between the first UWB circuitry and the at least one external electronic device and the relative angle between the second UWB circuitry and the at least one external electronic device having a value smaller than a predetermined value.

20. The method of claim 17, further comprising:
in response to a presence of multiple external electronic devices being positioned in the gaze direction, selecting an external electronic device from among the multiple external electronic devices,
wherein a difference between a relative distance between the first UWB circuitry and the external electronic device and a relative distance between the second UWB circuitry and the external electronic device is smaller.

21. The method of claim 17, wherein the selecting of the at least one external electronic device comprises:
identifying an external electronic device having a specified criterion from among multiple electronic devices; and
selecting the external electronic device.

22. The method of claim 21, wherein the specified criterion includes that a difference between a relative distance between the first UWB circuitry and the external electronic device and a relative distance between the second UWB circuitry and the external electronic device is smaller than a predetermined value.

23. The method of claim 21, wherein the specified criterion includes the user's motion.

24. The method of claim 13, further comprising:
limiting operations of the first UWB circuitry and the second UWB circuitry while a user is not moving.

* * * * *